US011408391B2

United States Patent
McNatt et al.

(10) Patent No.: US 11,408,391 B2
(45) Date of Patent: Aug. 9, 2022

(54) WAVE POWER DEVICE

(71) Applicant: MOCEAN ENERGY LTD., Edinburgh (GB)

(72) Inventors: James Cameron McNatt, Edinburgh (GB); Christopher Heinz Retzler, Edinburgh (GB)

(73) Assignee: MOCEAN ENERGY LTD., Edinburgh (GB)

( * ) Notice: Subject to any disclaimer, the term of this patent is extended or adjusted under 35 U.S.C. 154(b) by 92 days.

(21) Appl. No.: 16/081,582

(22) PCT Filed: Mar. 1, 2017

(86) PCT No.: PCT/GB2017/050548
§ 371 (c)(1),
(2) Date: Aug. 31, 2018

(87) PCT Pub. No.: WO2017/149302
PCT Pub. Date: Sep. 8, 2017

(65) Prior Publication Data
US 2019/0024623 A1    Jan. 24, 2019

(30) Foreign Application Priority Data

Mar. 1, 2016  (GB) ...................................... 1603563

(51) Int. Cl.
*F03B 13/20* (2006.01)

(52) U.S. Cl.
CPC .......... *F03B 13/20* (2013.01); *F05B 2250/00* (2013.01); *F05B 2250/292* (2013.01); *F05B 2250/411* (2013.01); *Y02E 10/30* (2013.01)

(58) Field of Classification Search
CPC .................. F03B 13/20; F05B 2250/00; F05B 2250/292; F05B 2250/411; Y02E 10/38
See application file for complete search history.

(56) References Cited

U.S. PATENT DOCUMENTS

| | | | |
|---|---|---|---|
| 4,098,084 A | 7/1978 | Cockerell | |
| 4,210,821 A * | 7/1980 | Cockerell | F03B 13/20 290/53 |
| 4,313,716 A | 2/1982 | Jones | |
| 5,619,943 A * | 4/1997 | Kieronski | B63B 1/121 114/352 |
| 6,476,511 B1 | 11/2002 | Yemm et al. | |

(Continued)

FOREIGN PATENT DOCUMENTS

| | | |
|---|---|---|
| DE | 10 2009 047 232 A1 | 6/2011 |
| FR | 2 400 117 | 8/1977 |

(Continued)

OTHER PUBLICATIONS

International Search Report and Written Opinion of the ISA for PCT/GB2017/050548 dated Jun. 12, 2017, 11 pages.

(Continued)

*Primary Examiner* — Connor J Tremarche
(74) *Attorney, Agent, or Firm* — Nixon & Vanderhye P.C.

(57) ABSTRACT

The invention provides a hinged raft wave energy conversion device (WEC) comprising: a first fore floating body; and a second aft floating body; wherein the first and second floating bodies are connected by a hinge joint for rotation of the bodies relative to each other, in use, about an axis parallel to the still water surface and transverse to the direction of wave propagation; wherein the first and second bodies extend away from the hinge joint in opposite directions; and wherein at least one of the first and second bodies has a sloped surface extending in the direction away from the hinge joint, at least a portion of the sloped surface being under the waterline at least when the device is in the still water rest position.

48 Claims, 11 Drawing Sheets

(56) References Cited

U.S. PATENT DOCUMENTS

| | | | |
|---|---|---|---|
| 8,008,792 B2* | 8/2011 | Gray | F03B 13/20 |
| | | | 290/42 |
| 9,068,553 B2 | 6/2015 | Mcgrath | |
| 2010/0213710 A1 | 8/2010 | Rhinefrank et al. | |
| 2011/0057448 A1 | 3/2011 | Page | |
| 2011/0192159 A1 | 8/2011 | Morgan et al. | |
| 2012/0087732 A1* | 4/2012 | Gray | E02B 9/08 |
| | | | 405/76 |
| 2014/0042749 A1* | 2/2014 | Siegel | F03B 13/183 |
| | | | 290/53 |
| 2014/0097617 A1* | 4/2014 | Rohrer | F03B 13/14 |
| | | | 290/42 |
| 2015/0082785 A1* | 3/2015 | Rohrer | F03B 13/182 |
| | | | 60/500 |
| 2015/0203183 A1 | 7/2015 | Ambs | |

FOREIGN PATENT DOCUMENTS

| | | | |
|---|---|---|---|
| GB | 2 113 311 | 8/1983 | |
| GB | 2514764 A | 12/2014 | |
| LV | 14830 B | 7/2013 | |
| WO | 01/96737 A1 | 12/2001 | |
| WO | 2008/004893 A1 | 1/2008 | |
| WO | 2008/121646 A1 | 10/2008 | |
| WO | 2008/135046 | 11/2008 | |
| WO | 2011/047418 A1 | 4/2011 | |
| WO | 2012/106558 | 8/2012 | |
| WO | WO-2012106558 A2* | 8/2012 | F03B 13/20 |

OTHER PUBLICATIONS

E. W. Weisstein, "Area Moment of Inertia", Wolfram MathWorld the web's most extensive mathematics resource, 1999-2020 Wolfram Research, Inc. (2 pages).

Chozas, J. F., Kofoed, J. P., & Jensen, N. E. H. (2014). *User guide—COE Calculation Tool for Wave Energy Converters: ver. 1.6*—Apr. 2014. (1 ed.) Aalborg: Department of Civil Engineering, Aalborg University. DCE Technical reports, No. 161 (61 pages).

* cited by examiner

WAVE POWER DEVICE

This application is the U.S. national phase of International Application No. PCT/GB2017/050548 filed Mar. 1, 2017 which designated the U.S. and claims priority to GB Patent Application No. 1603563.6 filed Mar. 1, 2016, the entire contents of each of which are hereby incorporated by reference.

FIELD OF THE INVENTION

The invention relates to the provision of hinged raft wave energy conversion devices for use in extracting power from wave energy. The invention relates in particular to hinged raft devices of novel geometry.

BACKGROUND TO THE INVENTION

A wide variety of wave energy conversion devices are known. The hinged raft type of device is a known concept that has the advantages over seabed located devices of not requiring extensive subsea foundations and, as the device floats, it can be readily towed to and from a suitable location for maintenance and repair as required.

In a hinged raft device at least two floating bodies are connected by a hinge joint. In use the motion of the waves causes relative motion between the floating bodies that can be converted to electrical energy, perhaps via a hydraulic drive system.

Original hinged raft designs and subsequent designs have used simple body geometries such as rectangular-barge shapes or cylinders (e.g. the well-known Pelamis machine).

Traditional hinged rafts are designed to be excited by forcing directly in flex by waves whose lengths are of the same order of magnitude as the length of the raft. In order to absorb power from long waves (which have more power), the rafts needed to be made long.

In most cases, the component bodies in hinged raft designs are of the same geometry; that is, the rafts have forward and aft symmetry about the hinge or hinges.

With all wave energy conversion devices the cost of manufacture, maintenance and repair, together with the cost of locating the device in the harsh maritime environment must be considered. Therefore there remains the need for improved devices.

DESCRIPTION OF THE INVENTION

One aspect of the invention provides a hinged raft wave energy conversion device (WEC) comprising:
 a first fore floating body; and
 a second aft floating body;
 wherein the first and second floating bodies are connected by a hinge joint for rotation of the bodies relative to each other, in use, about an axis parallel to the still water surface and transverse to the direction of wave propagation;
 wherein the first and second bodies extend away from the hinge joint in opposite directions; and
 wherein at least one of the first and second bodies is submerged or substantially submerged when the device is in the still water rest position.

The direction of wave propagation is the dominant direction of wave propagation at a location where the device is in use. The term still water surface denotes the plane provided by the surface of the body of water in which the device floats in use, when no or substantially no wave motion is present.

The term still water rest position denotes the position naturally adopted by the device when floating in a body of water when no or substantially no wave motion is present.

In use the first floating body is the fore body and the second floating body is the aft body. In use the fore floating body is towards the direction from which the waves approach the device and the aft body is behind the fore body with the hinge in between the bodies.

In use the rotational motion of the bodies about the hinge, that is flexing about the hinge caused by wave motion, can be converted to useable power, for example electricity, by various known means utilised in WECs. The power take off (PTO) system employed may be for example, a direct drive electrical generator or generators integrated with the hinge. Alternatives include gearbox driven generators. Yet further alternatives include pumping of a hydraulic system powered by the relative motion of the floating bodies or hinge parts. Hydraulic power can be converted to electrical power in the known manner.

Both floating bodies are typically elongate in the direction of propagation of waves i.e. the long axis of the floating bodies and the long axis of the device as a whole is in the direction of wave motion. Typically the device as a whole may have a total length to width (beam) ration of between 20:1 and 5:1.

At least one of the floating bodies is substantially submerged when the device is in the still water rest position. All or most of the submerged or substantially submerged floating body is under water, in the still water rest position. The connection to the hinge joint may be above the waterline as the hinge joint is typically at the waterline or above the waterline. However, the hinge joint may be below the waterline. More generally the term substantially submerged described herein means that the ratio, of the submerged volume of the floating body to its water plane area multiplied by the length of the body along the waterline, is at least more than 0.5, or more than 1, or even more than 3 . . . . For example, a floating body with 60 m$^3$ submerged volume and 10 m$^2$ water plane area and a length along the waterline of 5 m, will have a ratio of 60/(10×5)=60/50=1.2. The water plane area is the cross section area of the floating body along the waterline in the still water rest position. The length along the waterline is measured in the direction of wave propagation from the hinge joint to the distal end of the floating body, at the waterline, when the device is in the still water rest position.

Advantageously the substantially submerged floating body, or the submerged floating body, when in the still water rest position, extends downwardly and away from the hinge along an axis aligned with the direction of wave propagation. The submerged or substantially submerged floating body may have an axis extending downwards and away from the hinge joint at an angle of from 30 to 50 degrees from the horizontal.

A floating body that is substantially submerged has its resonant frequency altered, in comparison with a floating body that is less submerged by the presence of the added mass (the water mass that is moved when the body moves), which affects the response to the hydrostatic restoring force. The resonant frequencies in both the heave and pitch modes of motion of each body may be altered.

A submerged portion angled downwards and away from the hinge joint is excited by waves and induced to flex.

Both floating bodies may be submerged or substantially submerged. If so the bodies are formed and arranged to be dissimilar in resonant frequency. This arrangement constitutes a further aspect of the invention. Thus according to a further aspect the present invention provides a hinged raft wave energy conversion device (WEC) comprising:
- a first fore floating body; and
- a second aft floating body;
- wherein the first and second floating bodies are connected by a hinge joint for rotation of the bodies relative to each other, in use, about an axis parallel to the still water surface and transverse to the direction of wave propagation;
- wherein the first and second bodies extend away from the hinge joint in opposite directions;
- wherein both the first and second bodies are submerged or substantially submerged when the device is in the still water rest position; and
- wherein the floating bodies are formed and arranged to be dissimilar in resonant frequency.

This may be achieved, for example by having floating bodies that differ in one or more of shape, size, buoyancy, distribution of mass within the body, or position with respect to the still water surface when in the still water rest position. As discussed further hereafter with respect to particular embodiments, providing floating bodies of different resonant frequencies, at least with respect to the ratio of mass and added mass to hydrostatic spring force, can enhance the interaction of the devices of the invention with wave motion, especially in the heave, surge and pitch components of wave motion.

Advantageously one floating body is substantially submerged and the other floats on the surface. An arrangement of this type has different resonant frequencies for the two bodies, even if they are of the same dimensions and shape. The body floating on the surface may have at least 50% of its surface area wetted, in the still water rest position, to provide good interaction with the wave motion. Typically the floating body floating on the surface has an elongated top surface above the still water waterline extending away from the hinge.

The floating body floating on the surface may be defined using the same terminology as the substantially submerged floating body discussed above. The floating body floating on the surface has a ratio of the submerged volume of the floating body to its water plane area multiplied by the length of the body along the waterline, of less than 0.2 or even less than 0.1.

In an advantageous arrangement the first, fore floating body floats on the surface and the second, aft floating body is submerged or substantially submerged, in the still water rest position. Alternatively the reverse arrangement may be employed. The first, fore floating body is submerged or substantially submerged and the second, aft floating body is floating on the surface, in the still water rest position.

The hinge joint is formed and arranged for rotation of the first and second rotating bodies relative to each other, in use, about an axis parallel to the still water surface and transverse to the direction of wave propagation. The hinge joint may be arranged to allow movement in other directions, but a joint only allowing rotation about an axis parallel to the still water surface and transverse to the direction of wave propagation is sufficient to allow good power extraction for devices of the invention. Such a one degree of freedom (rotation about one axis) hinge joint has the advantage of simplicity over hinge joints allowing more complex motion of the floating bodies relative to each other.

As the floating bodies are arranged to have dissimilar resonant frequencies, the bodies may extend to different lengths away from the hinge joint i.e. the floating bodies may have different lengths. For example the first fore floating body may be longer than the second aft floating body or vice versa. An advantageous arrangement is where the ratio of length of the forward body to the length of the aft body is 1.5 to 1.

A particularly advantageous arrangement is provided by the first and second floating bodies being elongate, extending away from the hinge along the direction of propagation of waves and each having a generally cuboid or trapezoid shape. The first floating body (fore body) floats on the surface and the second floating body (aft body) is submerged or substantially submerged, extending downwards and away from the hinge, in the direction of wave propagation. An arrangement of this type as described in more detail hereafter shows benefits in power capture for a given size of device. The floating bodies have different resonant frequencies and combine to give good power capture. The bodies resonant in heave and pitch and this motion is coupled to and induces motion in flex and surge. This occurs even when the hinge only allows movement in rotation about an axis parallel to the still water surface and transverse to the direction of wave propagation.

Further improvement in power capture can be achieved where a floating body of the invention that floats on the surface has a sloped top surface extending downwards, in the direction away from the hinge joint to the end of the floating body distal to the hinged joint. As a floating body having this profile flexes about the hinge joint in response to wave motion, water tends to lap back and forth over the floating body. This water on the top surface of the floating body adds to the mass, affecting the resonant frequency of the floating body (giving it a longer period).

Advantageously the sloped top surface may extend to under the waterline when the floating body is in the still water rest position. This allows wave motion to more easily lap over the distal (to the hinge joint) end of the floating body, to provide benefit in power capture characteristics. Advantageously where a sloped top surface that extends to under the waterline is provided, the length of the floating body under the waterline, in the direction away from the hinge joint and in alignment with the direction of wave propagation, is at least 30% longer than the length of the floating body along the waterline (still water rest position).

Floating bodies having a sloped top surface that extends to under the waterline as described herein can provide benefits more generally in hinged raft wave energy conversion devices and constitute another aspect of the invention.

Thus the present invention also provides a hinged raft wave energy conversion device (WEC) comprising:
- a first fore floating body; and
- a second aft floating body;
- wherein the first and second floating bodies are connected by a hinge joint for rotation of the bodies relative to each other, in use, about an axis parallel to the still water surface and transverse to the direction of wave propagation;
- wherein the first and second bodies extend away from the hinge joint in opposite directions; and
- wherein at least one of the first and second bodies has a sloped top surface extending downwards, in the direction away from the hinge joint to the end of the floating body distal to the hinged joint, and extending to under the waterline when the device is in the still water rest position.

Where a sloped top surface is provided, the lapping of water, onto and off it, may tend to be turbulent. Testing model devices in a wave tank shows this effect as, for example when water runs onto a rectangular slope it comes in from the distal end of the floating body and from the sides of the floating body. Avoidance of turbulence may be achieved by fitting wall features to the top surface of the floating body, to either side of the sloping surface and extending in the direction of wave propagation. The wall features restrict the flow of water onto or off the sloping surface to the distal end of the floating body; or at least reduce water flow coming from the sides or leaving via the sides. A significant improvement in power capture has been observed (e.g. 20%; gains of up to 100% have been observed) in a model device of the invention fitted with wall features on a sloping top surface.

A floating body that floats on the surface and has a sloped top surface extending downwards, in the direction away from the hinge joint to the distal end of the floating body may be a fore body or an aft body (first or second floating body) in a device of the invention.

As discussed above a particularly advantageous arrangement is provided by the first and second floating bodies being elongate, extending away from the hinge along the direction of propagation of waves and each having a generally cuboid or trapezoidal shape. The first floating body (fore body) floats on the surface and the second floating body (aft body) is submerged or substantially submerged, extending downwards and away from the hinge, in the direction of wave propagation. Where this arrangement is provided, altering the generally cuboid or trapezoidal shape of the first floating body to have a sloped top surface extending downwards, in the direction away from the hinge joint to the end of the floating body distal to the hinged joint provides further improvement in power capture. This provides a "wedge" shape with a leading edge pointing towards the direction from which the waves approach the device. The addition of wall features to the top surface of the floating body, to either side of the sloping surface, can provide the additional improvement discussed above.

The WEC devices of the invention may include further floating bodies (third, fourth etc) with each floating body connected to the next by a hinge joint to provide a chain of floating bodies having a foremost floating body a first hinge, a second floating body (aft of the first), a second hinge a third floating body and so on until a last hinge joint and an aft most floating body.

The floating bodies of the invention may be constructed of any suitable materials for floating structures, such as steel. The first and second floating bodies are dissimilar in behaviour, especially resonance frequency as discussed above. The resonant frequency of a given shape and size of floating body may be altered in various ways. For example by altering features such as buoyancy, distribution of mass within the body, or position with respect to the still water surface when in the still water rest position. Thus for example ballast masses may be placed within the floating body to alter behaviour in response to wave motion. Changing the location of ballast changes the moments of inertia which affects rotational behaviour (or pitch resonant frequency). In general it is preferred that mass be concentrated toward the ends of a floating body rather than at the middle. Similarly gas (e.g. air) or liquid (e.g. sea water) filled chambers may be provided within the floating body to alter mass distribution and/or buoyancy.

The alterations to the natural frequency of a body of given size and shape, assuming uniform density, may be permanent i.e. a frequency behaviour is determined by the construction particulars of the floating body. Alternatively floating bodies may be adjustable in resonant frequency in use. Resonant frequency may be altered to better suit particular sea states for example by flooding chambers with sea water or air and/or by having moveable masses (moveable ballast masses).

Where a floating body is submerged or substantially submerged, and extends downwardly and away from the hinge along an axis aligned with the direction of wave propagation, this position can be obtained by providing appropriate buoyancy to the floating body, without requiring biasing of the hinge joint. For example a buoyancy chamber or chambers may be provided at or near the hinge joint with the rest of the floating body being less buoyant so that it will extend downwards and away from the hinge joint in the still water rest position i.e. in the desired fashion. This may not be required in all examples. Where the buoyancy and gravitational forces are suitably balanced for the device as a whole it will float, even if one of the floating bodies is not independently buoyant. The buoyancy chamber or chambers provided at or near the hinge joint also assists in providing a restoring force in the flex action of the device.

The wave energy conversion devices of the invention are suitable for use with ocean or sea waves over a wide range of wavelengths, say from 100 to 200 m wavelength, which may be considered good quality waves for power extraction purposes. The devices move substantially in heave, pitch, surge, as well as flex (as compared to the standard hinged raft) to capture more energy from waves that have a longer mean wavelength than the length of the device. And so they can be smaller and less expensive to construct. The devices may be shorter in length, along the axis running in the direction of wave motion than the expected mean wavelength. For example, where waves are of about 100 m wavelength the device of the invention may be of the order of 50 m-90 m in length.

These relatively short devices can be used in an array of devices placed relatively close together, to provide a wave power farm where collection of the electrical power output from each device to a common point for onwards distribution can be readily arranged.

As the devices are floating devices they do not require extensive seabed foundations such as required for typical underwater devices mounted on the seabed. The devices can be towed to their working location and placed with the aid of relatively simple anchors. The devices are placed with a fore floating body and an aft floating body with the hinge in between. When extracting energy form the wave motion, the devices will tend to "weathervane" if they are elongate in the direction of wave motion. The device tends to turn to align correctly with the hinge joint transverse to the direction of wave motion.

This effect may be enhanced where the second (aft) floating body is submerged or substantially submerged and extends downwards and away from the hinge joint. It can act to some extent as a sea anchor, keeping the device heading into the direction where the wavers come from.

A yet further aspect of the invention provides a hinged raft wave energy conversion device (WEC) comprising:
  a first fore floating body; and
  a second aft floating body;
  wherein the first and second floating bodies are connected by a hinge joint for rotation of the bodies relative to each other, in use, about an axis parallel to the still water surface and transverse to the direction of wave propagation;
  wherein the first and second bodies extend away from the hinge joint in opposite directions; and
  wherein at least one of the first and second bodies has a (typically planar) sloped (e.g. top or bottom) surface (or sloped top and bottom surfaces) extending in the direction away from the hinge joint (typically in the direction away from the hinge joint and towards a distal end of the said body), at least a portion of the sloped surface being under the waterline (i.e. still water surface) at least when the device is in the still water rest position.

It will be understood that the sloped surface of each of one or more of the said at least one of the first and second bodies is sloped relative to the waterline at least when the device is in the still water rest position.

It may be that the sloped surface extends in the said direction away from the hinge joint at an angle of from 10° to 80° to the horizontal, more preferably at an angle of from 20° to 50° to the horizontal.

It may be that the sloped surface of each of one or more of the said at least one of the first and second bodies is straight along its length (typically in a direction aligned with the direction of wave propagation). Alternatively it may be that the sloped surface of each of one or more of the said at least one of the first and second bodies comprises a plurality of straight portions of different gradients along its length. Alternatively, it may be that the sloped surface of each of one or more of the said at least one of the first and second bodies is (typically continuously) curved along its length. By providing each of one or both bodies with a sloped surface having a gradient (whether straight or curved) which varies along its length, an additional degree of design freedom (i.e. how the gradients of the first and second bodies vary along their lengths) is provided which allows the device to be further optimised for particular prevailing wave conditions.

Typically each of one or more of the said at least one of the first and second bodies has a top surface opposite a bottom surface. Typically the said sloped surface of each of one or more of the said at least one of the first and second bodies is a said top surface or a said bottom surface of the said (respective) at least one of the first and second bodies. Typically the top surface of a said body is the uppermost surface of the said body along its length. Typically the bottom surface of a said body is the lowermost surface of the said body along its length.

It may be that one or both of the first and second bodies are elongate (typically in the respective directions away from the hinge joint).

It may be that at least one of the first and second bodies has a (typically planar) sloped surface (or sloped top and bottom surfaces) extending downwards (typically relative to the still water surface), in the direction away from the hinge joint (typically in the direction away from the hinge joint and towards a distal end of the said body), at least a portion of the sloped surface being under the waterline at least when the device is in the still water rest position.

It may be that at least one of the first and second bodies has a sloped top surface extending (e.g. downwards, e.g. relative to the still water surface) in the direction away from the hinge joint (typically in the direction away from the hinge joint and towards a distal end of the said body), at least a portion of the sloped top surface being under the waterline at least when the device is in the still water rest position.

It may be that at least one of the first and second bodies has a sloped top surface extending downwards, in the direction away from the hinge joint to the end of the floating body distal to the hinged joint, and extending to under the waterline when the device is in the still water rest position.

It may be that at least one of the first and second bodies has a sloped top surface extending downwards, in the direction away from the hinge joint and in alignment with the direction of wave propagation, at least a portion of the sloped top surface being under the waterline at least when the device is in the still water rest position.

It may be that at least one of the first and second bodies has a sloped bottom surface extending in the direction away from the hinge joint (typically in the direction away from the hinge joint and towards a distal end of the said body), at least a portion of the sloped bottom surface being under the waterline at least when the device is in the still water rest position.

It may be that at least one of the first and second bodies has a sloped bottom surface extending downwards, in the direction away from the hinge joint (typically in the direction away from the hinge joint and towards a distal end of the said body), at least a portion of the sloped bottom surface being under the waterline at least when the device is in the still water rest position.

It may be that the length of the or each floating body having a sloped top surface extending under the waterline, in the direction away from the hinge joint and in alignment with the direction of wave propagation, is at least 30% longer than the length of the floating body along the waterline, when the device is in the still water rest position.

It may be that each of one or more of the said at least one of the first and second bodies comprises a (typically planar, e.g. top and/or bottom) surface having a first portion and a second portion, wherein the said first portion comprises the said sloped surface and the said second portion has a gradient different from that of the said sloped surface. By providing each of one or both bodies with a surface having a gradient (whether straight or curved) which varies along its length, an additional degree of design freedom (i.e. how the gradients of the first and second bodies vary along their lengths) is provided which allows the device to be further optimised for particular prevailing wave conditions.

Typically the said second portion of the said surface extends from the said first portion, typically in the said direction away from the hinge joint. It may be that the said first and second portions of the said surface are integrally formed with each other. It may be that the first and second portions of the said surface are continuations of the same surface.

It may be that the said first portion of the said surface is attached to the said second portion of the said surface by a further hinge joint. This makes it easier for the said body to be transported (e.g. towed through the water) as the first portion can be rotated relative to (e.g. folded onto) the second portion (e.g. such that it is parallel to the second portion) about the further hinge joint for transportation. It may be that, when the body is installed as part of the raft, the first portion is rotated relative to (e.g. unfolded from) the second portion about the further hinge joint. It may be that the further hinge joint comprises a locking mechanism configurable to secure the first portion in folded or unfolded positions as required. The further hinge joint between the first and second portions may provide a discontinuity in the said surface.

Typically the said second portion of the said surface has a gradient different from that of the said sloped surface in the said direction away from the hinge joint.

Typically the said second portion of the said surface is sloped with respect to the still water surface, or it may be that the said second portion of the said surface extends horizontally or vertically with respect to the still water surface, at least when the device is in the still water rest position.

It may be that the said second portion of the said surface is fore or aft of the said sloped surface at least when the device is in the still water rest position.

By a first feature being fore of a second feature, it will be understood that the first feature is towards the direction from which waves approach the device relative to the second feature.

By a first feature being aft of a second feature, it will be understood that the second feature is towards the direction from which waves approach the device relative to the first feature.

Typically the said opposing directions away from the hinge joint are fore and aft directions away from the hinge joint.

It may be that the said sloped surface of each of one or more of the said at least one of the first and second bodies has a first (typically downwards) gradient (typically in the direction away from the hinge joint) and that the said second portion of the said surface has a second (typically downwards) gradient (typically in the direction away from the hinge joint), the magnitude of the second gradient being different from (e.g. less (or shallower) than or greater (or steeper) than) the magnitude of the first gradient. It may be that the said sloped surface of each of one or more of the said at least one of the first and second bodies slopes downwards relative to the still water surface (or relative to the horizontal) as it extends in a fore or aft direction (i.e. fore or aft relative to the direction of wave propagation) and that the said second portion of the said surface slopes upwards relative to the still water surface (or relative to the horizontal) as it extends in a fore or aft direction (i.e. fore or aft relative to the direction of wave propagation).

Typically at least a portion of the said second portion of the said surface is provided under the waterline at least when the device is in the still water rest position.

It may be that the said second portion of the said surface is fore or aft of the first portion of the said surface.

It may be that an angle between a tangent to the said sloped surface and the vertical differs from an angle between a tangent to the said second portion of the said surface and the vertical by between 10° and 80°.

It may be that the sloped surface of each of one or more of the said at least one of the first and second floating bodies is a top surface thereof, the said top surface comprising wall features on either side of the sloped surface and extending in a direction aligned with the direction of wave propagation.

It may be that each of one or more of the said at least one of the first and second floating bodies has a wedge shape with a leading edge pointing towards the direction from which the waves approach the device.

It may be that at least the first, fore body comprises a said sloped (e.g. top and/or bottom) surface.

It may be that at least the second, aft body comprises a said sloped (e.g. top and/or bottom) surface.

It may be that the first, fore body comprises a said sloped bottom surface. It may be that the said sloped bottom surface of the first, fore body is entirely under the waterline at least when the device is in the still water rest position. That is, it may be that the said sloped bottom surface does not extend above the waterline.

It may be that the first, fore body comprises a sloped top surface.

It may be that the second, aft body comprises a said sloped top surface

It may be that the second, aft body comprises a said sloped bottom surface.

It may be that the first, fore body comprises a distal end (i.e. distal to the hinge joint) which is (typically entirely) under the waterline at least when the device is in the still water rest position. This helps to improve the survivability of the device. It may be that the distal end is a distal end of the first, fore body and of the said sloped surface of the said first, fore body.

It may be that each of one or more of the said at least one of the first and second bodies comprises a first portion comprising the said sloped surface thereof, the said first portion of the said body extending from a second portion of the said body provided fore or aft of the said first portion of the said body, the said second portion of the said body having a mean density which is different from (e.g. greater than or less than) a mean density of the said first portion. It may be that the second portion of the said body has converging top and bottom surfaces extending towards the said first portion. It may be that the second portion of the said body floats at the water surface.

Typically the first portion of the said body extends between (and typically comprises) top and bottom surfaces of the said body.

Typically the second portion of the said body extends between (and typically comprises) top and bottom surfaces of the said body.

It may be that the first portion of the said body has a thickness (or mean thickness) between its top and bottom surfaces which is less than a thickness (or mean thickness) of the second portion of the said body between its top and bottom surfaces.

It may be that the said first portion of the said body comprises a plate comprising the said sloped surface (the plate typically having a (typically planar, typically sloped with respect to the still water surface) surface facing a direction having a component aligned with the direction of wave propagation).

It may be that the said plate extends from (e.g. converging) top and bottom surfaces of the said second portion of the said body.

It may be that a bottom surface of the said plate extends from a bottom surface of the said second portion of the said body. It may be that a top surface of the said plate extends from an intermediate surface of the said second portion of the said body intermediate its top and bottom surfaces.

It may be that each of one or more of the said at least one of the first and second floating bodies comprises a wave flow resisting portion at least a portion of which is provided under the waterline at least when the device is in the still water rest position, the said wave flow resisting portion comprising the said sloped surface of the said floating body. It may be that the wave flow resisting portion has a surface facing a direction having a component aligned with the direction of wave propagation. For example, it may be that the first, fore body comprises a wave flow resisting portion having an outward facing surface normal (typically of its top surface) a component of which faces in the opposite direction to the direction of wave propagation. In another example, it may be that the second, aft body comprises a wave flow resisting portion having an outward facing surface normal (typically of its top surface) a component of which faces in the direction of wave propagation.

Typically the (respective) wave flow resisting portion has a surface area onto which incident waves can exert force. This increases the quantity of energy which can be extracted from incident waves when compared with, for example, bodies without wave flow resisting portions having sloped surfaces at least portions of which are under the waterline.

Typically the (respective) wave flow resisting portion of the (respective) body is configured to capture forces in surge from incident waves to thereby generate a torque about the hinge joint.

It may be that the first, fore floating body comprises a said wave flow resisting portion comprising a said sloped surface (at least a portion of which is provided under the waterline at least when the device is in the still water rest position), wherein the first, fore floating body comprises a further portion aft of the wave flow resisting portion from which the wave flow resisting portion extends, wherein the said wave flow resisting portion extends further vertically under the waterline than the said further portion at least when the device is in the still water rest position.

It may be that the second, aft floating body comprises a said wave flow resisting portion comprising a said sloped surface (at least a portion of which is provided under the waterline at least when the device is in the still water rest position), wherein the second, aft floating body comprises a further portion fore of the wave flow resisting portion from which the wave flow resisting portion extends, wherein the said wave flow resisting portion extends further vertically under the waterline than the said further portion at least when the device is in the still water rest position.

Typically the (or one or more or each said) wave flow resisting portion has a distal end under the waterline at least when the device is in the still water rest position.

Typically the (or one or more or each said) distal end of the wave flow resisting portion comprises a hydrodynamic fairing.

It may be that the sloped surface of each of one or more of the said at least one of the first and second floating bodies is a top surface thereof, the said top surface comprising wall features on either side of the sloped surface and extending in a direction aligned with the direction of wave propagation. It may be that the said wall features on one or both sides of the said sloped surface comprise hydrodynamic fairings.

Typically the (or each of one or more or each said) hydrodynamic fairing comprises a curved hydrodynamic surface configured to inhibit the generation of turbulent water flow from received incoming waves. Typically the (or each of one or more or each said) hydrodynamic fairing comprises a curved hydrodynamic surface configured to inhibit the generation of turbulent water flow due to flow caused by motion of the first and/or second bodies. Typically the curved hydrodynamic surface of the or each said distal end extends between (and typically forms at least portions of) the top and bottom surfaces of the said body comprising the said distal end.

It may be that a (respective) volume of water sits on a portion of each of one or more of the said at least one of the first and second bodies comprising the said sloped surface thereof, the said portion of the said body being submerged under the waterline at least when the device is in the still water rest position. This water adds to the effective mass of the body, thereby changing the ratio of the inertial force of the body relative to the hydrostatic spring force exerted on the body, thereby changing the resonant frequency of the body in flex about the hinge joint (giving it a longer period). This allows the device to capture more energy from waves that have a longer mean wavelength than the length of the device (in the direction of wave propagation), allowing devices to be used which are shorter in length (and therefore less expensive to construct) in the direction of wave propagation. For particular wave conditions (in particular when the (longer) period of the resonant frequency of the body in flex about the hinge is matched to a mean wavelength of prevailing incident waves for a given site), the added effective mass allows the device to capture more energy from incident waves.

It may be that the said volume of water sits on the said sloped surface. Typically a vertical (i.e. parallel to the principal direction in which gravity acts locally, typically perpendicular to the still water surface) component of the outward facing normal to the said sloped surface extends through the said volume of water and the still water surface at least when the device is in the still water rest position.

It may be that the sloped surface of each of one or more of the said at least one of the first and second bodies extends from above the waterline to under the waterline at least when the device is in the still water rest position.

It may be that the first and second floating bodies are formed and arranged to be dissimilar in resonant frequency.

It may be that the first and second floating bodies have dissimilar resonant frequencies in flex about the hinge joint.

It may be that the first and second floating bodies have dissimilar resonant frequencies in heave.

It may be that the first and second floating bodies have dissimilar resonant frequencies in pitch.

It may be that the first and second floating bodies have dissimilar resonant frequencies in surge.

It may be that the resonant frequencies of the first and second bodies in flex about the hinge joint are dependent on their respective resonant frequencies in heave and/or in pitch and/or in surge.

It may be that the said resonant frequencies of the first and second bodies are dissimilar by at least a factor of 1.2, at least a factor of 1.5, at least a factor of 2, at least a factor of 3 or at least a factor of 4.

It may be that the device is a self-reacting raft WEC device. By self-reacting, we mean that the necessary motion of the raft to absorb power from incoming waves is a reaction of one body against the other by way of the hinge joint (rather than, for example, a reaction against a foundation on the sea floor).

Typically the device is configured to provide self-reacting, rotational movement between the first and second bodies about the said hinge joint responsive to incident waves. It may be that the device is secured in position by way of a mooring, but typically the mooring is not an integral part of the power take off system. That is, the raft typically does not react against a foundation on the sea floor by way of its mooring to generate power.

Typically at least one of the floating bodies is buoyant. Typically at least one of the floating bodies has a mean density which is less than that of water (or sea water). It may be that one of the floating bodies has a mean density which is greater than that of water (or sea water).

It may be that the said floating bodies are rigid contiguous floating bodies under normal operational conditions. For example, as mentioned above, there may be a hinge joint between portions of a said floating body to make transportation easier, but the said hinge joint may be locked (i.e. such that rotation about the hinge joint is not possible) in normal use, thereby making the body a rigid contiguous floating body in normal use.

It may be that both the first, fore body and the second, aft body comprise (typically planar) sloped surfaces extending in the said respective directions away from the hinge joint, at least part of each of the said sloped surfaces being under the waterline at least when the device is in the still water rest position.

It may be that the second, aft body is longer than the first, fore body (e.g. in a direction aligned with the direction of wave propagation).

It may be that the sloped surface of the second body extends further vertically beneath the waterline than the sloped surface of the first body at least when the device is in the still water rest position. Typically the sloped surface of the second body extends further vertically beneath the waterline than the first body at least when the device is in the still water rest position.

It may be that both the first, fore floating body and the second, aft floating body comprise respective said wave flow resisting portions comprising respective said sloped surfaces extending away from the hinge joint, at least part of each said wave flow resisting portion (typically including at least portions of the said respective sloped surfaces) being under the waterline at least when the device is in the still water rest position.

It may be that the wave flow resisting portion of the second, aft floating body extends further vertically under the waterline than the first, fore floating body.

A yet further aspect of the invention provides a hinged raft wave energy conversion device (WEC) comprising:
- a first fore floating body; and
- a second aft floating body;
- wherein the first and second floating bodies are connected by a hinge joint for rotation of the bodies relative to each other, in use, about an axis parallel to the still water surface and transverse to the direction of wave propagation;
- wherein the first and second bodies extend away from the hinge joint in opposite directions; and
- wherein, at least when the device is in the still water rest position, at least one of the first and second floating bodies has a wave flow resisting portion extending under the waterline.

Typically the said wave flow resisting portion of the or each said floating body extends further vertically under the waterline than a further portion of the said floating body from which it extends (which may be, for example, fore or aft the said wave flow resisting portion) or further vertically under the waterline than the other of the said floating bodies.

Typically the (respective) wave flow resisting portion has a surface area onto which incident waves can exert force. This helps to increase the quantity of energy which can be extracted from incident waves.

It may be that at least a portion of the wave flow resisting portion of each of one or more of the said at least one of the first and second floating bodies is submerged under the waterline such that a volume of water sits on the said submerged portion at least when the device is in the still water rest position. As before, the volume of water changes the ratio of inertial force of the body relative to the hydrostatic spring force exerted on the body, thereby changing the resonant frequency of the body in flex about the hinge joint. This allows the device to capture more energy from waves that have a longer mean wavelength than the length of the device (in the direction of wave propagation), allowing devices to be used which are shorter in length (and therefore less expensive to construct) in the direction of wave propagation. For particular wave conditions (in particular when the (longer) period of the resonant frequency of the body in flex about the hinge is matched to a mean wavelength of prevailing incident waves for a given site), the added mass of the water on the body allows the device to capture more energy from incident waves.

It may be that the first, fore floating body comprises a said wave flow resisting portion, wherein the first, fore floating body comprises a further portion from which the wave flow resisting portion extends in a direction fore of the said further portion, wherein the said wave flow resisting portion extends further vertically under the waterline than the said further portion at least when the device is in the still water rest position. It may be that the wave flow resisting portion has a mean density which is greater than that of the said further portion.

It may be that the second, aft floating body comprises a said wave flow resisting portion, wherein the second, aft floating body comprises a further portion from which the wave flow resisting portion extends in a direction aft of the said further portion, wherein the said wave flow resisting portion extends further vertically under the waterline than the said further portion at least when the device is in the still water rest position. It may be that the wave flow resisting portion has a mean density which is greater than that of the said further portion.

It may be that the second, aft floating body comprises a said wave flow resisting portion, wherein the said wave flow resisting portion extends further vertically under the waterline than the first, fore floating body.

It may be that both the first, fore floating body and the second, aft floating body comprise respective said wave flow resisting portions, at least part of each said wave flow resisting portion extending under the waterline at least when the device is in the still water rest position, wherein the wave flow resisting portion of the second, aft floating body extends further vertically under the waterline than the first, fore floating body.

It may be that the wave flow resisting portion (or each of one or more said wave flow resisting portions) has a surface facing a direction having a component aligned with the direction of wave propagation.

A yet further aspect of the invention provides a hinged raft wave energy conversion device (WEC) comprising:
- a first fore floating body; and
- a second aft floating body;
- wherein the first and second floating bodies are connected by a hinge joint for rotation of the bodies relative to each other, in use, about an axis parallel to the still water surface and transverse to the direction of wave propagation;
- wherein the first and second bodies extend away from the hinge joint in opposite directions; and
- wherein at least a portion of at least one of the first and second bodies is submerged under the waterline such that a volume of water sits on the said submerged portion at least when the device is in the still water rest position.

This volume of water adds to the effective mass of the body, changing the ratio of inertial force of the body relative to the hydrostatic spring force exerted on the body, thereby changing the resonant frequency of the body in flex about the hinge joint. This allows the device to capture more energy from waves that have a longer mean wavelength than the length of the device (in the direction of wave propagation), allowing devices to be used which are shorter in length (and therefore less expensive to construct) in the direction of wave propagation. For particular wave conditions (in particular when the (longer) period of the resonant frequency of the body in flex about the hinge is matched to a mean wavelength of prevailing incident waves for a given site), the added effective mass allows the device to capture more energy from incident waves.

It may be that said at least a portion of each of one or more of the said at least one of the first and second bodies comprises a horizontal surface (i.e. parallel to the still water surface or horizontal relative to the vertical direction in which gravity acts locally). It may be that the said at least a portion of each of one or more of the said at least one of the first and second bodies comprises a vertical surface (i.e. perpendicular to the still water surface or parallel to the vertical direction in which gravity acts locally). It may be that the horizontal surface extends in the said direction away from the hinge joint. It may be that the said horizontal surface extends from the said vertical surface. It may be that the said horizontal surface and the said vertical surface are integrally formed with each other.

A yet further aspect of the invention provides a hinged raft wave energy conversion device (WEC) comprising:
 a first fore floating body; and
 a second aft floating body;
 wherein the first and second floating bodies are connected by a hinge joint for rotation of the bodies relative to each other, in use, about an axis parallel to the still water surface and transverse to the direction of wave propagation;
  wherein the first and second bodies extend away from the hinge joint in opposite directions; and
  wherein the first and second floating bodies are formed and arranged to be dissimilar in resonant frequency.

It may be that the first and second floating bodies are dissimilar in resonant frequency in flex about the hinge joint.

Although various aspects and embodiments of the present invention have been described separately above, any of the aspects and features of the present invention can be used in conjunction with any other aspect, embodiment or feature where appropriate. For example apparatus features may where appropriate be interchanged with method features.

BRIEF DESCRIPTION OF THE DRAWINGS

Further preferred features and advantages of the present invention will appear from the following detailed description given by way of example of some preferred embodiments illustrated with reference to accompanying drawings in which.

DETAILED DESCRIPTION OF SOME EMBODIMENTS WITH REFERENCE TO THE DRAWINGS

Figure 1A:
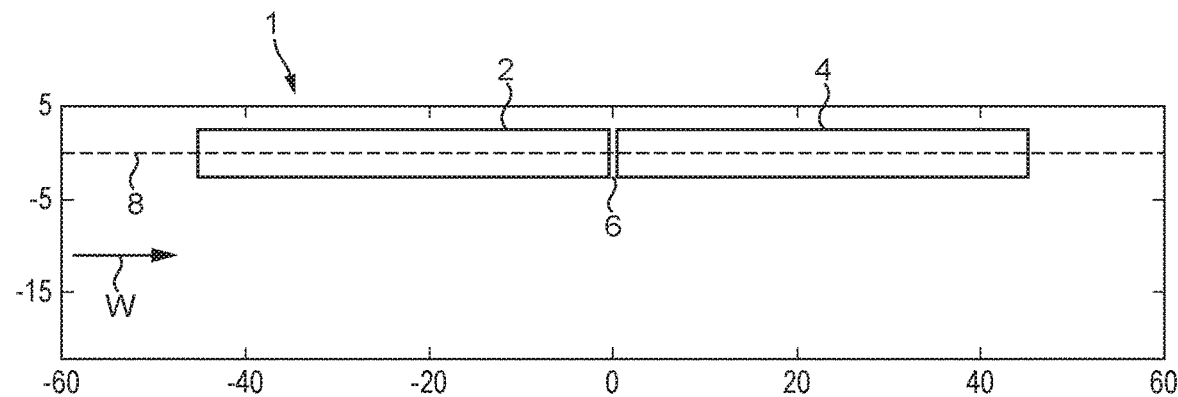
FIGS. 1a to 1c are schematic elevation views of wave energy conversion devices in the still water at rest position.
Figure 1B:
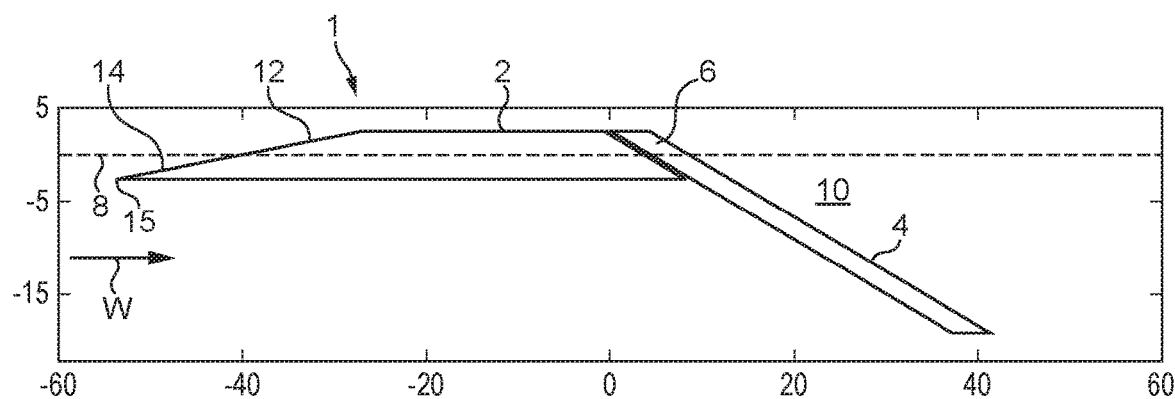
Figure 1C:
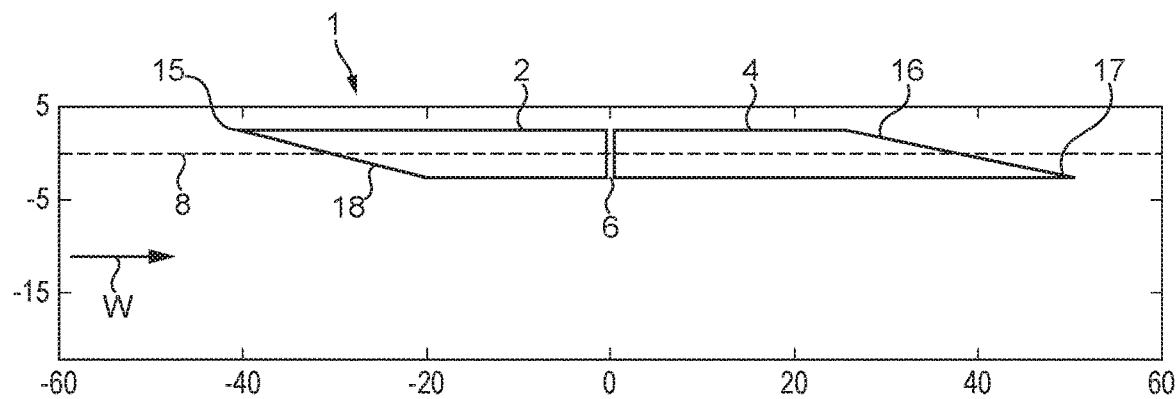

FIGS. 1a, 1b, and 1c show, in schematic elevation hinged raft wave energy conversion devices 1. A scale in metres is provided to indicate the dimensions of these examples. For all three devices in these figures the thickness (height) is 5 m (2.5 above the waterline and 2.5 below) and the width (beam) is 8 m.

In FIG. 1a the device 1 (about 91 m in length) comprises a fore floating body 2 and an aft floating body 4 connected by a hinge joint 6. The still water line is indicated by dashed line 8. The water plane area for each floating body, 2 or 4, is the cross section area of the body in the plane of the still water line 8. The direction of wave propagation is indicated by arrow W in this and all subsequent figures showing devices. In FIG. 1a the fore floating body 2 and the aft floating body 4 are symmetrical cuboids, elongate in the direction of wave propagation.

Figure 4A:
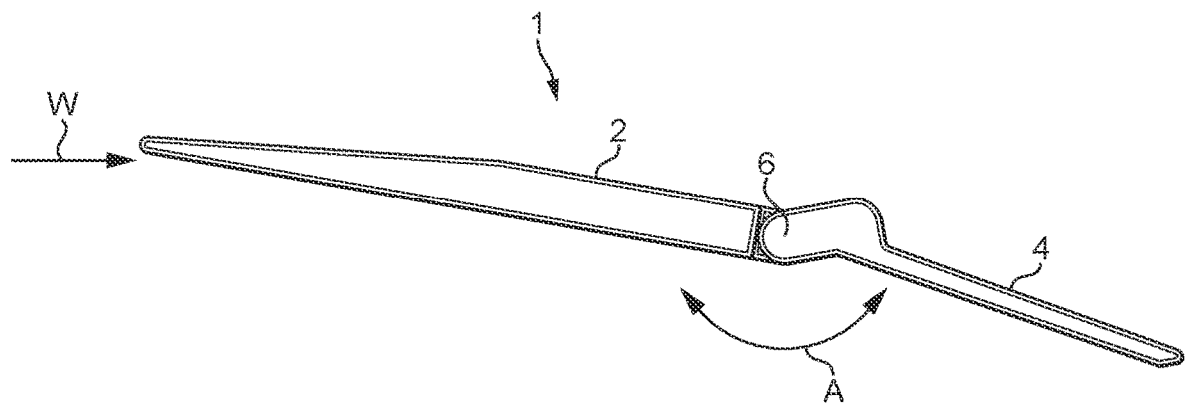
FIGS. 4a and 4b are schematic elevation views of the device of FIG. 3 showing positive and negative flex positions.
Figure 4B:
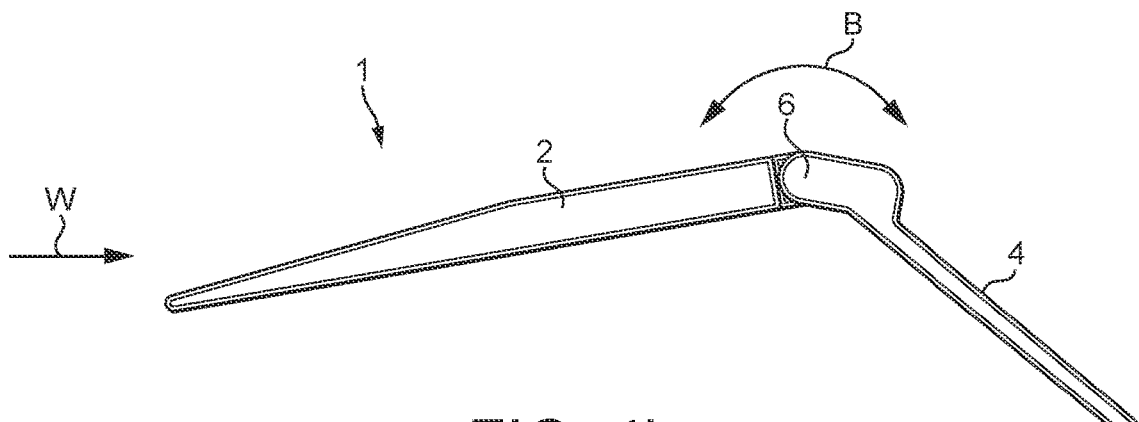
Figure 5:
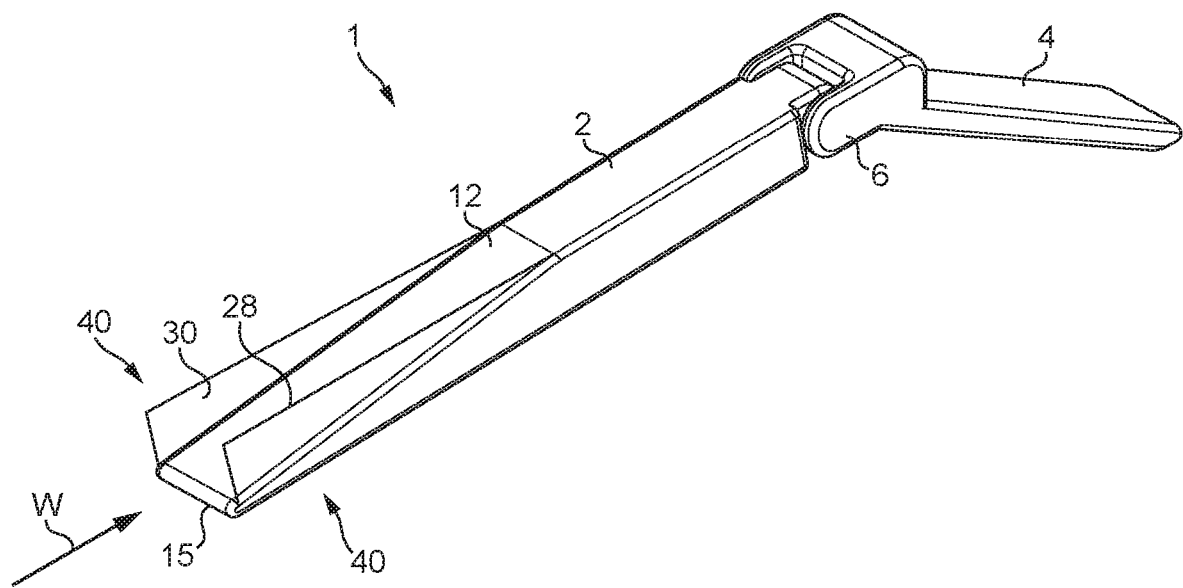
FIG. 5 shows the device of FIG. 3 fitted with wall features.

In FIG. 1b a device 1 is shown with a fore floating body 2 floating on the surface. The aft floating body 4 angles downwards and away from the hinge joint 6 and is almost entirely submerged the still water rest position shown. More details of this device are shown in FIGS. 3 to 5 and discussed below. A portion 10 of the body of water sits above the aft floating body 4. The device 1 is about 95 m in length in this example. The device 1 also includes a sloping top surface 12 on the fore floating body 2 that extends to below the water surface 8 so that a relatively small portion 14 of the body of water sits above the sloping top surface 12 near the end 15 of floating body 2 that is distal to the hinge joint 6. Both the fore floating body 2 and the aft floating body 4 are elongate in the direction W of wave propagation and generally cuboid in shape.

In FIG. 1c the device 1 (about 91 m in length) comprises a fore floating body 2 and an aft floating body 4 connected by a hinge joint 6. The still water line is indicated by dashed line 8. The fore floating body 2 and the aft floating body 4 are symmetrical cuboids, elongate in the direction of wave propagation, except for slope features. The fore floating body 2 has a sloping under surface 18 extending downwards and towards the hinge joint 6 from the distal end 15. The aft floating body has a sloping top surface 16 on the aft floating body 4 that extends to below the water surface 8 so that a relatively small portion 17 of the body of water sits above the sloping top surface 16 near the end of floating body 4 that is distal to the hinge joint 6.

The performance of the devices depicted in FIGS. 1a to 1c has been calculated in terms of power capture per mass in different wavelength waves. Calculation is based on a detailed mathematical analysis of the motion of the devices when considered as constrained bodies undergoing small motions and being acted upon by wave motion. The analysis shows that hinged raft devices with dissimilar resonance frequencies can extract power not only from the heave (vertically up and down component of wave motion), but also from at least the surge and pitch components of wave motion. All the devices analysed have approximately the same surface area thus:
 FIG. 1a—2,050 m²
 FIG. 1b—2,052 m²
 FIG. 1c—1,866 m²
The masses are also similar:
 FIG. 1a—1,845 metric tonnes
 FIG. 1b—1,700 metric tonnes
 FIG. 1c—1,410 metric tonnes
The ratio of submerged volume:water plane area multiplied by length along the waterline, for each body is calculated to be as follows.
 FIG. 1a—each body: submerged volume: 909 m^3, water plane area: 364 m^2, length along the waterline 45 m
 submerged volume/water plane area x length along the waterline: 0.06
 FIG. 1b—fore body 2: submerged volume: 1050 m^3, water plane area: 352 m^2, length along the waterline 44 m
 submerged volume/water plane area x length along the waterline: 0.07
 FIG. 1b—aft body 4 (substantially submerged): submerged volume: 608 m^3, water plane area: 32 m^2, length along the waterline 4 m
 submerged volume/water plane area x length along the waterline: 4.8
 FIG. 1c—fore body 2: submerged volume: 500 m^3, water plane area: 240 m^2, length along the waterline 30 m
 submerged volume/water plane area x length along the waterline: 0.07
 FIG. 1c—aft body 4: submerged volume: 875 m^3, water plane area: 300 m^2, length along the waterline 37.5 m
 submerged volume/water plane area x length along the waterline: 0.08

The fore body 2 in FIG. 1b and the aft body 4 in FIG. 1c both feature a slope 12, 16 that extends below the waterline to the end distal to the hinge joint 6. For the fore body 2 in FIG. 1b the length along waterline 8 is 44 m and the length below waterline is 61 m, about 39% longer than the waterline length. For the aft body 4 in FIG. 1c the length along waterline is 37.5 m and the length below waterline is 50 m, about 33% longer than the waterline length.

Figure 2:
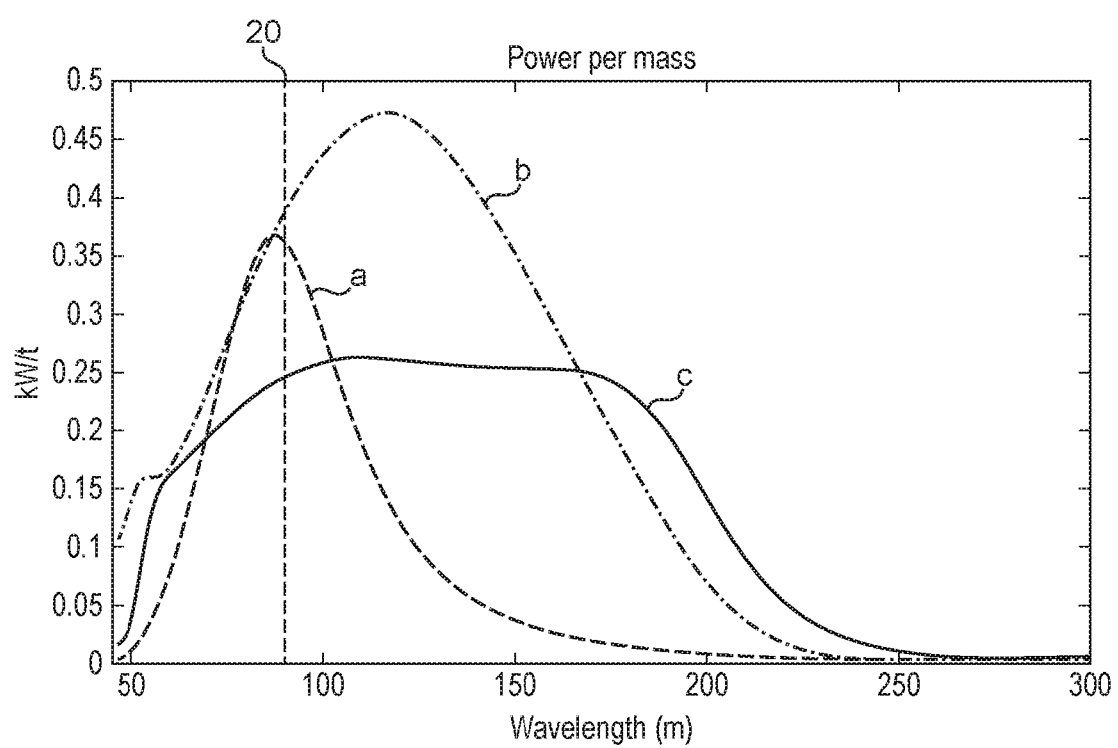
FIG. 2 is a graphical representation of power outputs from the devices of FIGS. 1a to 1c in waves of different wavelength.

The results calculated in terms of power capture per mass in different wavelength waves are shown graphically in FIG. 2 with the power capture per mass (KW/t) versus wavelength of waves from 50 to 300 m shown. The 90 m wavelength position is shown by dashed line 20 as this is the approximate length of the devices analysed.

The line for the device of FIG. 1a is marked a, the line for the device of FIG. 1b is marked b and the results for the device of FIG. 1c is marked c. The device of FIG. 1a has a peak power output (line a) at a wavelength close to 90 m, approximating to its own length. The output is fairly narrowly focused around this wavelength.

The device of FIG. 1c has a lower peak power output, (line c) but a much broader range of wavelengths where output is relatively high, from about 55 m to about 180 m.

The device of FIG. 1b (line b) has a notably higher peak output than that of devices 1a or 1c. The peak output is at a longer wavelength (about 120 m) than the device of FIG. 1a and the output curve is broader showing good power output over a much broader, notably longer, range of wavelengths. This demonstrates the benefits obtainable by making use of a substantially submerged floating body 4 combined with a fore floating body, floating at the surface and having the sloping top surface 12. A relatively shorter device can extract power efficiently from longer wavelengths and from a broad range of wavelengths.

Figure 3A:
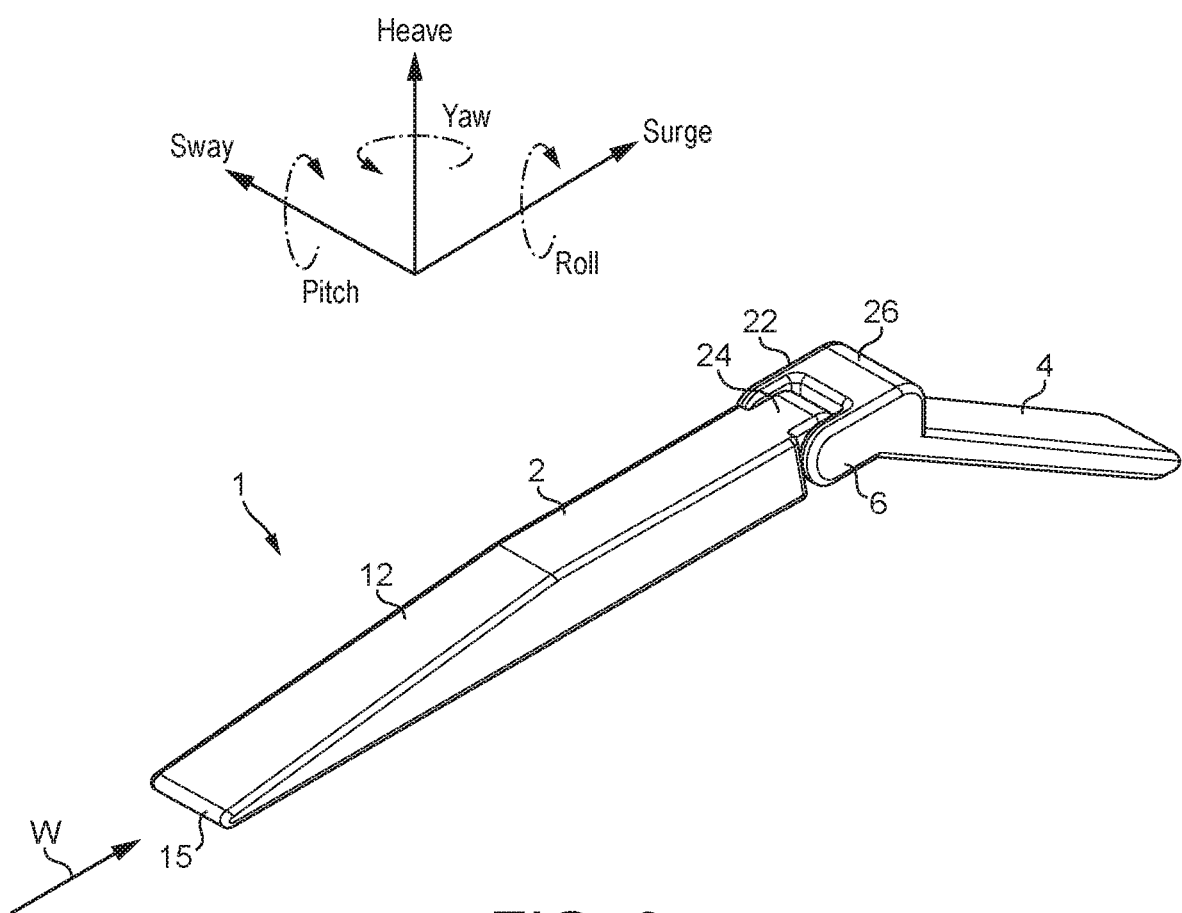
FIGS. 3a to 3c are schematic perspective, elevation and plan views of a wave energy conversion device.
Figure 3B:
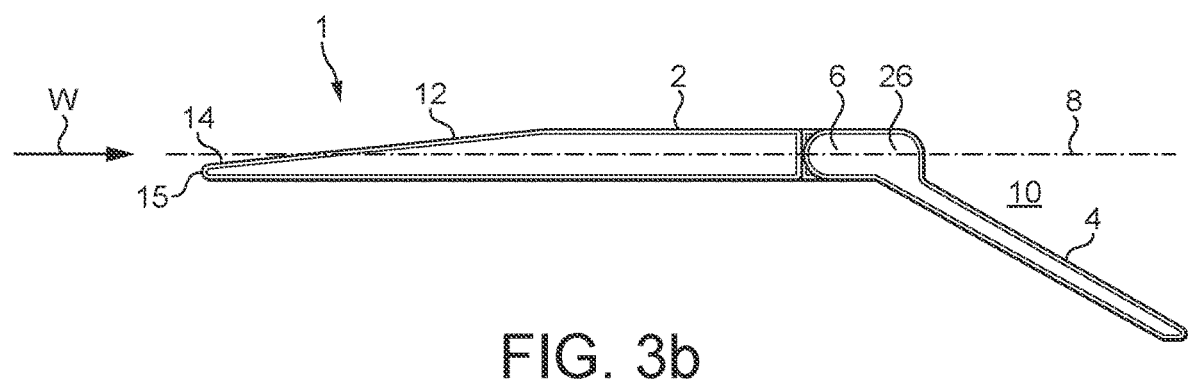
Figure 3C:
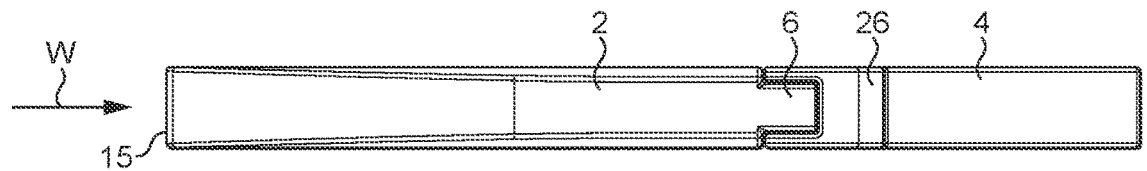

A device of the type depicted in FIG. 1a is shown in more detail, with like parts numbered the same, in FIGS. 3 to 5. In FIG. 3a the device 1 is shown in schematic perspective together with a schematic 23 indicating the six modes of motion possible in relation to the normal axes of the drawing: heave, surge, pitch, roll, sway and yaw. In this example the hinge joint 6 comprises a yolk 22 extending from aft floating body 4 for rotation about an extension 24 of the fore floating body 26. A power take of system (PTO) such as an electrical generator or generators will be enclosed within the hinge joint 6 and electrical power fed via an umbilical cable (not shown) to a suitable destination.

The aft floating body 4 includes a buoyancy chamber 26 near the hinge joint 6 so that the attitude of the aft body 4 is as shown in elevation 3b when the device 1 is in the still water rest condition. As can also be seen from FIG. 3b the fore floating body sits at rest with about half its surface area wetted. The device of FIG. 3a is also shown in plan view 3c.

In use, when waves act upon the device the two floating bodies 2 and 4 rotate relative to each other about hinge joint 6. The device 1 flexes about the hinge joint 6. As depicted in elevation FIG. 4a shows a positive flex motion where the relative motion of fore body 2 with respect to aft body 4 is suggested by curved arrow A. Such a position may be produced when a wave crest is passing the front of floating body 2. FIG. 4b depicts the device with a negative flex, motion suggested by curved arrow B. Such a position may be produced when a wave crest is passing the hinge joint 6.

As discussed above and shown in FIG. 2, the device of FIGS. 1b, and 3 to 5 shows improved power capture characteristics, including a higher power output for a relatively small device, shorter in length that the expected waves. A further improvement, (up to 20%) can be obtained by fitting wall features 28, 30 (FIG. 5) to either side, port and starboard of sloping top surface 12. These wall features allow water to readily lap onto the sloping surface 12 for distal end 15 of the body 2, for example when in a negative flex position as depicted in FIG. 4b. At the same time the wall features 28, 30 prevent or at least reduce the flow of water from the sides suggested by arrows 40. This results in a smoother flow of water to and fro as the end 15 dips into and out of the waves.

Figure 6:
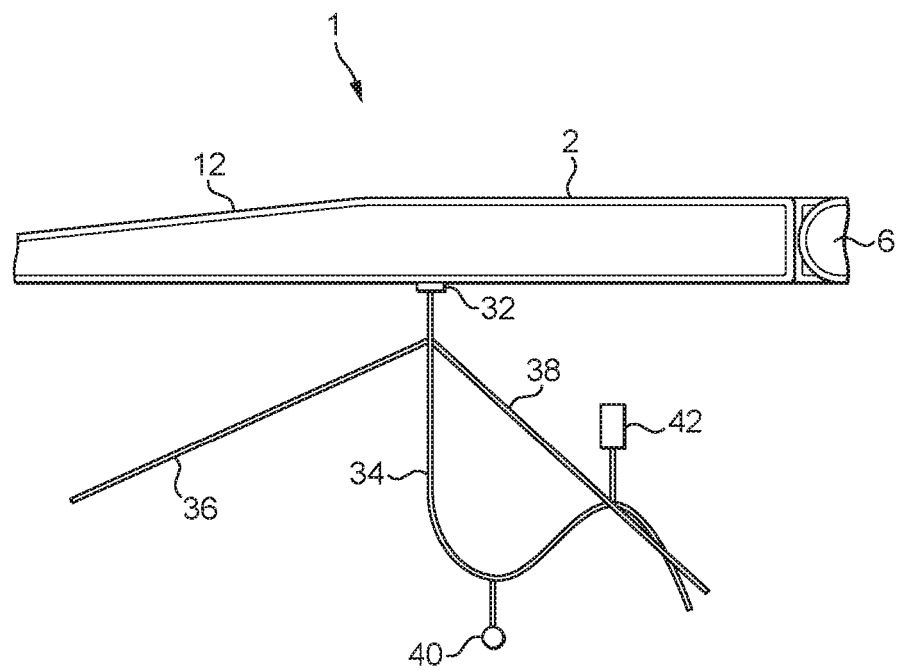
FIG. 6 shows a mooring arrangement.

FIG. 6 shows in schematic elevation part of a device 1 of the form shown in FIG. 3. The fore floating body 2 has an attachment point 32 on its underside, to which an umbilical 34 and mooring lines 36, 38 are attached. The mooring lines extend to the sea bed and are anchored thereto (not shown). The umbilical includes cabling for control signals and data signals to and from the device 1, and also a power cable to carry electricity generated. The umbilical 34 has a sinker weight 40 and a float 42 to provide an S shape bend in the umbilical that allows up and down motion of the device without pulling the umbilical taut and perhaps causing damage. The mooring point is on the fore floating body, and is near the front of the fore floating body so that the body will weathervane, tend to maintain its correct position with respect to the predominant direction of wave propagation.

Figure 7:
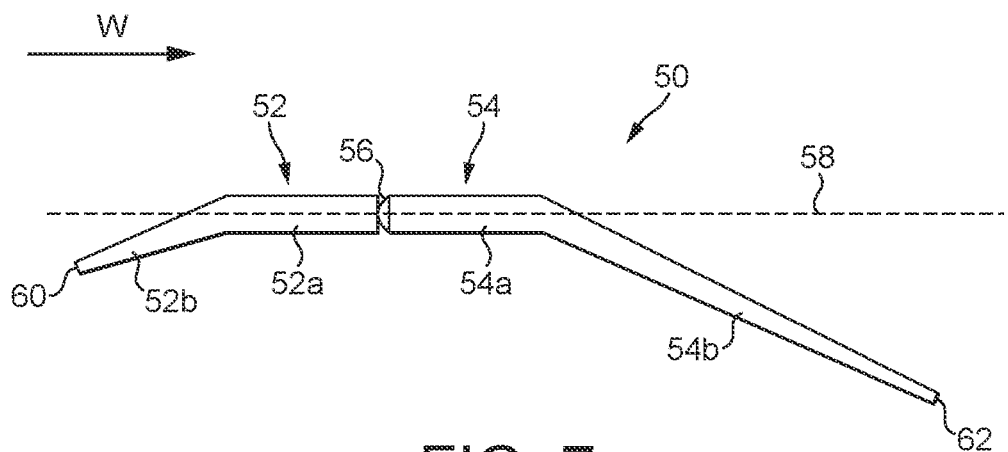
FIGS. 7-10 are schematic elevation views of alternative raft wave energy conversion devices in the still water at rest position.

FIG. 7 shows in schematic elevation an alternative hinged raft wave energy conversion device 50 in the still water rest position, the device 50 comprising a first, fore floating body 52 and a second, aft floating body 54 connected by a hinge joint 56. It may be that the bodies 52, 54 comprise air or liquid filled chambers which are configurable to alter the density, mean density, mass or buoyancy of the bodies. The chambers may contain moveable ballast masses as described above. The still water line is indicated by dashed line 58. As before, the hinged raft wave energy conversion device 50 is configured to convert wave energy to electrical energy by way of incoming waves causing relative flexing of the bodies 52, 54 about the hinge 56. To do this, a power take of system (PTO) such as an electrical generator or generators is typically enclosed within the hinge joint 56 and electrical power fed via an umbilical cable (not shown) to a suitable destination. The device 50 is secured in position by way of a mooring comprising one or more mooring lines (not shown) connected to one or both of the bodies 52, 54 and anchored to the sea bed (not shown), but typically the mooring is not an integral part of the power take off system. That is, the device 50 does not typically react against a foundation on the sea floor by way of its mooring in order to generate power, but rather is self-reacting.

The fore body 52 comprises a first buoyant portion 52a and a second buoyant portion 52b fore of the first buoyant portion 52a. The first buoyant portion 52a conforms to a cuboidal shape and floats at the water surface, having a top portion having a planar top surface (parallel to the waterline 58) above the waterline 58 and a bottom portion having a planar bottom surface (also parallel to the waterline 58) beneath the waterline 58. The first portion 52a extends away from the hinge joint 56 in a fore direction parallel to the direction of wave propagation W to the second buoyant portion 52b. The second buoyant portion 52b has top and bottom surfaces which are sloped downwards relative to top and bottom surfaces of the first portion 52a respectively and relative to the still water surface 58 (at angles of around 40° and 30° to the horizontal respectively) as it extends in a fore direction from the first portion 52a towards a fore edge 60 (fore distal end) of the first body 52. The top and bottom surfaces of the second buoyant portion 52b converge towards each other in the said fore direction until they terminate at the fore edge 60. The top surface of the second buoyant portion 52b extends from the top surface of the first buoyant portion 52a above the still water surface to beneath the still water surface 58 as it extends between the first buoyant portion 52a and the fore edge 60. The bottom surface of the second buoyant portion 52b is entirely under the still water surface 58.

A volume of water sits on the portion of the top surface of the said second buoyant portion 52b provided beneath the still water surface 58, thereby increasing the effective mass of the second buoyant portion 52b and its resistance to wave induced movement in clockwise (where the water is lifted vertically upwards) and anti-clockwise (where water is sucked vertically downwards) rotational directions in the elevation view of FIG. 7. The volume of water changes the ratio of inertial force of the first body 52 relative to the hydrostatic spring force exerted on the first body 52, thereby changing the resonant frequency of the first body in flex about the hinge joint 56 (giving it a longer period compared to, for example, the resonant frequency in flex about the hinge joint of the first, fore body in the arrangement of FIG. 1a). This allows the device 50 to capture more energy from waves that have a longer mean wavelength than the length of the device (in the direction of wave propagation), allowing the device 50 to be shorter in length (and therefore less expensive to construct) in the direction of wave propagation. For particular wave conditions (in particular when the (longer) period of the resonant frequency of the first body 52 in flex about the hinge 56 is matched to a mean wavelength of prevailing incident waves for a given site), the second portion 52b of the body and the water sitting thereon allows the device 50 to capture more energy from incident waves.

The second buoyant portion 52b of the first body 52 also acts as a wave flow resisting portion which increases the surface area of the first body 52 onto which incident waves can exert force (as compared to the first portion 52a alone), thereby increasing the magnitude of the wave excitation force. The wave flow resisting portion can also help to shift the peak wavelength of the wave excitation force to longer wavelengths relative to the length of the device in the direction of wave propagation. In addition, the wave flow resisting portion increases the surge force (force in the horizontal direction parallel to the direction of wave propagation) exerted by incident waves on the first body 52 which generates torque about the hinge joint 56 (as compared to, for example, the raft of FIG. 1a which experiences predominantly a heave force (force in the vertical direction)).

The second portion 52b of the first body 52 thus allows more power to be absorbed by the raft 50 compared to the design shown in FIG. 1a, helping to reduce the cost of energy extracted from incoming waves.

In addition, the surfaces of the second buoyant portion 52b of the first body 52 which slope downwards away from the hinge joint beneath the still water surface 58 to the fore edge 60 (in particular the sloping bottom surface) also improve the survivability of the device 50 because they make it more difficult for powerful incoming waves (in the direction W) to flow under the first body 52 (which could otherwise cause the said first body 52 to be moved away from its intended position at the water surface).

In some embodiments, the slopes of the top and/or bottom surfaces of the second buoyant portion 52b of the first body 52 vary along their lengths. For example, FIG. 11 (in which the first portion 52a of the first body 52 is identical to that shown in FIG. 7, and which omits the hinge joint 56 and the second body 54) shows an alternative version of the first body 52 in which the planar top and bottom sloped surfaces of the second buoyant portion 52b have proximal portions 52b' (proximal to the first portion 52a) extending in a fore direction from the first buoyant portion 52a and having steeper downward gradients as they extend in the direction away from the hinge joint than respective distal portions 52b" (distal to the first portion 52a) thereof which extend in the said fore direction (in this case from the proximal portions 52b') to the fore edge 60. Indeed, the proximal portions 52b' of the top and bottom surfaces slope downwards relative to the still water surface 58 (and thus to the horizontal, in this case at angles of around 40° and 30° to the horizontal respectively) and converge towards each other as they extend in the fore direction, while the distal portion 52b" of the top surface slopes downward as it extends in the fore direction with a shallower gradient than that of the proximal portion 52b' of the top surface (in this case at an angle of around 5° to the horizontal) and the distal portion 52b" of the bottom surface is sloped slightly upwards relative to the still water surface 58 (and thus relative to the horizontal, in this case at an angle of around 10° to the horizontal) as it extends in the fore direction (such that the distal portion of the bottom surface converges with the distal portion of the top surface). The angle between a tangent to the said proximal portion of the top or bottom surface and the vertical differs from the angle between a tangent to the said distal portion of the said respective top or bottom surface and the vertical by 35° and 40° respectively.

The different gradients of the proximal and distal portions 52b', 52b" of the top and bottom surfaces of the second portion 52b of the first body 52 cause water from incident waves to change direction as it flows over the length of the first body 52. Different pressure distributions are thereby generated along the lengths of the proximal and distal portions 52b', 52b", thereby causing different forces to be exerted along their lengths by the incoming water flow. The gradients of the proximal and distal portions 52b', 52b" thus affect the torque generated about the hinge joint when incident waves are incident on the first body 52. Accordingly, by providing the proximal and distal portions 52b', 52b" of the top and bottom surfaces of the second portion 52b of the first body 52 with different gradients, an additional degree of freedom (relative gradients of top and bottom surfaces of the proximal and distal portions) is provided which can be optimised to extract the maximum power output for a given set of prevailing wave conditions (e.g. compared to a body or a portion of a body having a constant gradient along its length).

It will be understood that the proximal portions 52b' of the top and bottom surfaces may alternatively be provided with relatively shallower gradients in the fore direction than those of the distal portions 52b" and the distal portions 52b" may be provided with relatively steeper gradients than those of the proximal portions 52b' in the fore direction to achieve similar effects. It will also be understood that the (distal or proximal) portion of the second portion 52b having the shallower slope may be horizontal (or may even slope slightly upwards) with respect (i.e. parallel) to the still water surface 58 as it extends in the fore direction. It may be that the portion of the second portion 52b having the steeper slope may be vertical with respect to (i.e. perpendicular) the still water surface 58.

Figure 11:
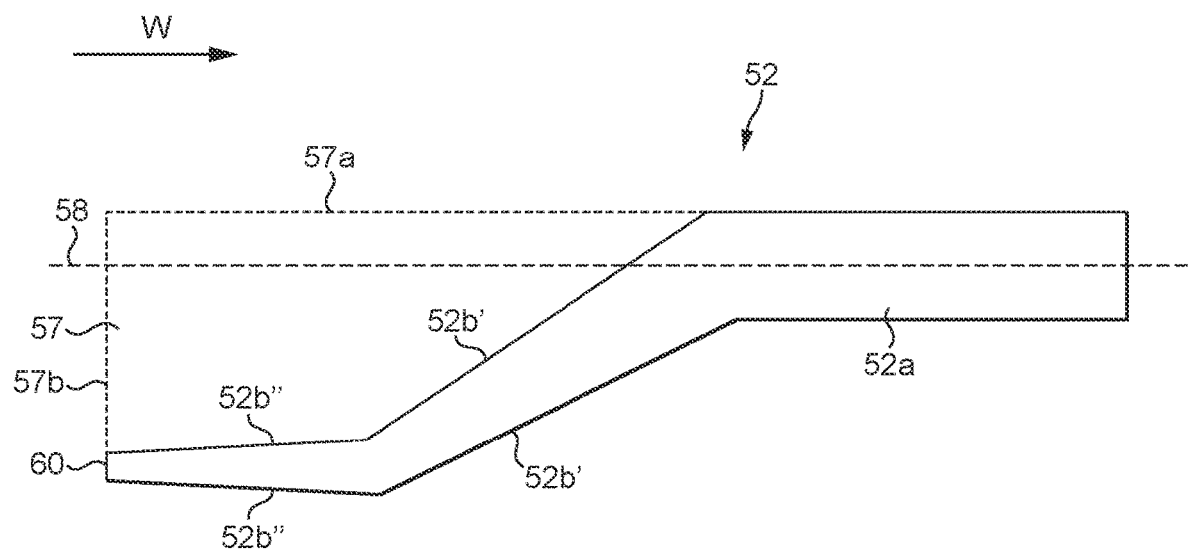
FIG. 11 is a schematic side elevation view of part of an alternative raft wave energy conversion device in the still water at rest position.

Also shown in FIG. 11 are wall features 57 extending along the top surface of the second portion 52b between the first portion 52a and the fore edge 60 to prevent or at least reduce the flow of water from the sides. In this case, the walls 57 have upper edges 57a parallel to the top surface of the first portion 52a and fore edges 57b extending vertically upwards from the fore edge 60 of the second portion 52b of the first body 52 to meet the upper edges 57a at right angles. The upper edges 57a of the walls are above the still water surface 58.

Referring back to FIG. 7, the second buoyant portion 52b has a greater mean density to that of the first buoyant portion 52a.

The aft body 54 comprises a first buoyant portion 54a and a second buoyant portion 54b aft of the first buoyant portion 54a. The first buoyant portion 54a conforms to a cuboidal shape and floats at the still water surface, having a top portion having a planar top surface (parallel to the waterline 58) above the waterline 58 and a bottom portion having a planar bottom surface (also parallel to the waterline 58) beneath the waterline 58. The first portion 54a extends from the hinge joint 56 in a direction parallel to the direction of wave propagation W to the second buoyant portion 54b. The second buoyant portion 54b has top and bottom surfaces which are sloped downwards relative to top and bottom surfaces of the first portion 54a respectively and relative to the still water surface 58 (at angles of around 40° and 30° to the horizontal respectively) as it extends from the first portion 54a towards an aft edge 62 (aft distal end) of the second body 54. The top and bottom surfaces of the second buoyant portion 54b converge towards each other in the said aft direction until they terminate at the aft edge 62 of the second body 54. The top surface of the second buoyant portion 54b extends from the top surface of the first buoyant portion 54a above the still water surface to beneath the still water surface 58 as it extends between the first buoyant portion 54a and the aft edge 62. The bottom surface of the second buoyant portion 54b is entirely under the still water surface 58 as it extends between the first buoyant portion 54a and the aft edge 62.

The second buoyant portion 54b of the second body 54 acts as a wave flow resisting portion which increases the surface area of the second body 54 onto which incident waves can exert force (as compared to the first portion 54a alone), thereby increasing the magnitude of the wave excitation force. The wave flow resisting portion can also help to shift the peak wavelength of the wave excitation force to longer wavelengths relative to the length of the device in the direction of wave propagation. In addition, a volume of water sits on the portion of the top surface of the said second buoyant portion 54b provided beneath the still water surface 58, thereby increasing the effective mass of the second body 54 and its resistance to wave induced movement in clockwise and anticlockwise rotational directions in the elevation view of FIG. 7. The volume of water changes the ratio of inertial force of the second body 54 relative to the hydrostatic spring force exerted on the second body 54, thereby changing the resonant frequency of the second body 54 in flex about the hinge joint 56 (giving it a longer period compared to, for example, the resonant frequency in flex about the hinge joint of the second, aft body in the arrangement of FIG. 1a). This allows the device 50 to capture more energy from waves that have a longer mean wavelength than the length of the device (in the direction of wave propagation), allowing the device 50 to be shorter in length (and therefore less expensive to construct) in the direction of wave propagation. For particular wave conditions (in particular when the (longer) period of the resonant frequency of the second body 54 in flex about the hinge 56 is matched to a mean wavelength of prevailing incident waves for a given site), the second portion 54b of the second body 54 and the water sitting thereon allows the device 50 to capture more energy from incident waves.

In addition, the wave flow resisting portion also increases the surge force (force in the horizontal direction parallel to the direction of wave propagation) exerted on the second body 54 which generates torque about the hinge joint 56 (as compared to, for example, the raft of FIG. 1a which experiences predominantly a heave force (force in the vertical direction)).

The second portion 54b of the second body 54 thus allows more power to be absorbed by the raft 50 compared to the design shown in FIG. 1a, helping to reduce the cost of energy extracted from incoming waves.

The second buoyant portion 54b of the second body 54 extends deeper vertically under the still water surface 58 than the second buoyant portion 52b of the said first body 52 (and indeed deeper than the first body 52 as a whole). The gradients of the top and bottom surfaces of the second buoyant portion 54b of the second body 54 have the same magnitudes as the gradients of the top and bottom surfaces of the second buoyant portion 52b of the first body 52 albeit in opposing directions with respect to the hinge joint 56. The aft edge 62 of the second body 54 is deeper vertically under the water surface 58 than the fore edge 60 of the first body 52 (and indeed deeper than the first body 52 as a whole), thereby making the device 50 asymmetrical about the hinge joint 56 and providing the first and second bodies 52, 54 with dissimilar resonant frequencies to each other, at least in flex about the hinge joint 56. The first portions 52a, 54a of the first and second bodies 52, 54 have the same lengths along the still water surface 58.

It will be understood that the second buoyant portion 54*b* of the second body 54 has a greater mean density to that of the first buoyant portion 54*a* of the second body 54.

Figure 8:
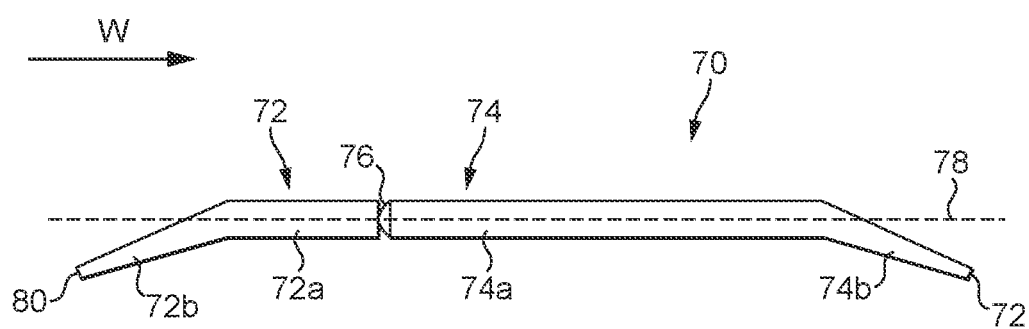

FIG. 8 shows in schematic elevation another alternative hinged raft wave energy conversion device 70 in the still water rest position, the device 70 comprising a first, fore floating body 72 (identical to floating body 52 above) and a second, aft floating body 74 connected by a hinge joint 76. The still water line is indicated by dashed line 78. As before, the hinged raft wave energy conversion device 70 is configured to convert wave energy to electrical energy by way of incoming waves causing relative flexing of the bodies 72, 74 about the hinge 76.

The first and second bodies 72, 74 are similar to bodies 52, 54 described above. However, in this case, the second portion 72*b* of the first body has a fore edge 80 (fore distal end) and the second portion 74*b* of the second body 74 has an aft edge 82 (aft distal end) which extend to the same depth under the still water surface as each other. The respective planar top and bottom surfaces of the second portions 72*b*, 74*b* of the first and second bodies 72, 74 slope with gradients of the same magnitudes as each other with respect to the still water surface 68 (and with respect to the horizontal), albeit in opposing directions with respect to the hinge joint 76. The lengths of the first portions 72*a*, 74*a* of the first and second bodies 72, 74 along the still waterline are dissimilar to each other, thereby making the device 50 asymmetrical about the hinge joint 56 and providing the first and second bodies 52, 54 with dissimilar resonant frequencies to each other, at least in flex about the hinge joint 56. In particular, the length of the first portion 74*a* of the second body 74 along the still waterline 78 is significantly greater than the length of the first portion 72*a* of the first body 72 along the still waterline 78, in this case by more than a factor of two.

As before the top surfaces of the second portions 72*b*, 74*b* of the first and second bodies 72, 74 sloping downwards under the water surface 78 in respective directions away from the hinge joint 76 cause respective volumes of water to be provided between the second portions 72*b*, 74*b* and the water surface, thereby increasing the resistances of the bodies 72, 74 to rotation about the hinge joint 76, changing the ratio of inertial force of the first bodies 72, 74 relative to the hydrostatic spring forces exerted on the said bodies 72, 74, thereby changing the resonant frequencies of the said bodies 72, 74 in flex about the hinge joint 76.

Figure 9:
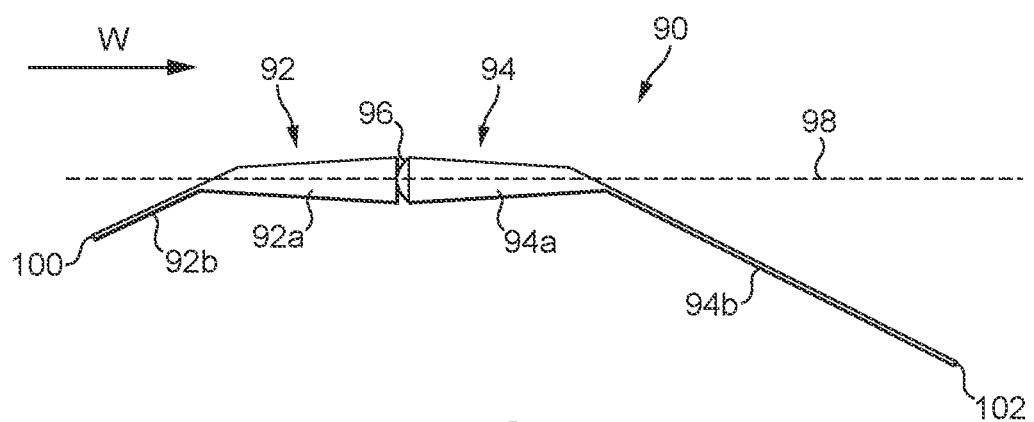

FIG. 9 shows in schematic elevation another alternative hinged raft wave energy conversion device 90 in the still water rest position, the device 90 comprising a first, fore floating body 92 and a second, aft floating body 94 connected by a hinge joint 96. The still water line is indicated by a dashed line 98. As before, the hinged raft wave energy conversion device 90 is configured to convert wave energy to electrical energy by way of incoming waves causing relative flexing of the bodies 92, 94 about the hinge 96.

The first and second bodies 92, 94 are similar to bodies 52, 54 shown in FIG. 7 and described above. However, in this case, the first portions 92*a*, 94*a* of the first and second bodies 92, 94 have converging fore and aft edges (converging towards each other in a vertically upwards direction) and converging top and bottom surfaces (converging towards each other in fore and aft directions respectively) and extending between the fore and aft edges (rather than conforming to cuboidal shapes). The first portion 92*a* of the first body 92 has planar top and bottom surfaces which are angled downwards and upwards respectively by around 10° to the horizontal from an aft edge of the first body 92 in a fore direction such that they converge towards each other, while the first portion 94*a* of the second body 94 has planar top and bottom surfaces which are angled downwards and upwards respectively by around 10° to the horizontal from a fore edge of the second body 94 in an aft direction such that they converge towards each other. In addition, the second portions 92*b*, 94*b* of the first and second bodies 92, 94 are provided in the form of plates which each have respective top and bottom surfaces which are parallel or substantially parallel to each other and are each angled at approximately 25° to the horizontal, the second portion 92*b* of the first body 92 having a fore edge 100 and the second portion 94*b* of the second body 94 having an aft edge 102. The mean density of the respective second portions 92*b*, 94*b* is significantly greater (in this case by a factor of two) than the mean density of the respective first portions 92*a*, 94*a* of the first and second bodies 92, 94. In some embodiments, the mean densities of one or both of the second portions 92*b*, 94*b* of the bodies 92, 94 is/are greater than that of water (or sea water) whilst the mean densities of one or both the first portions 92*a*, 94*a* of the first and second bodies 92, 94 are less than that of water (or sea water), meaning that the first portions 92*a*, 94*a* of the first and/or second bodies 92, 94 keep the device 90 afloat.

Figure 10:
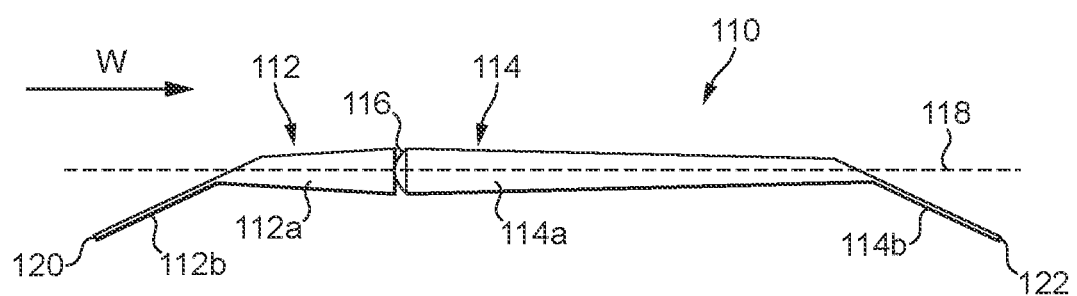

FIG. 10 shows in schematic elevation another alternative hinged raft wave energy conversion device 110 in the still water rest position, the device 110 comprising a first, fore floating body 112 and a second, aft floating body 114 connected by a hinge joint 116. The still water line is indicated by a dashed line 118. As before, the hinged raft wave energy conversion device 110 is configured to convert wave energy to electrical energy by way of incoming waves causing relative flexing of the bodies 112, 114 about the hinge 116.

The first and second bodies 112, 114 are similar to bodies 72, 74 shown in FIG. 8 and described above. However, in this case, the first portions 112*a*, 114*a* of the first and second bodies 112, 114 have converging fore and aft edges (converging towards each other in a vertically upwards direction) and converging top and bottom surfaces (converging towards each other in fore and aft directions respectively) and extending between the fore and aft edges (rather than conforming to cuboidal shapes). The first portion 112*a* of the first body 112 has planar top and bottom surfaces which are angled downwards and upwards respectively by around 10° to the horizontal from an aft edge of the first body 112 in a fore direction such that they converge towards each other, while the first portion 114*a* of the second body 114 has planar top and bottom surfaces which are angled downwards and upwards respectively by around 10° to the horizontal from a fore edge of the second body 114 in an aft direction such that they converge towards each other. In addition, the second portions 112*b*, 114*b* are provided in the form of plates which each have respective planar top and bottom surfaces which are parallel or substantially parallel to each other and are angled at approximately 25° to the horizontal, the second portion 112*b* of the first body 112 having a fore edge 120 and the second portion 114*b* of the second body 114 having an aft edge 122. The mean densities of the respective second portions 112*b*, 114*b* are significantly greater than those of the respective first portions 112*a*, 114*a* of the first and second bodies 112, 114. In some embodiments, the mean densities of one or both of the second portions 112*b*, 114*b* of the bodies 112, 114 are greater than that of water (or sea water) whilst the mean densities of one or both of the first portions 112*a*, 114*a* of the first and second bodies are less than that of water (or sea water), meaning that the first portions 112*a*, 114*a* of the first and/or second bodies 112, 114 keep the device 90 afloat.

In each of the above embodiments, the first and second portions of each of the first and second bodies are integrally formed with each other such that the top and bottom surfaces of their respective first and second portions are continuations of the same surface in each case. However, it will be understood that this is not necessary and that, alternatively, the first and second portions may not be integrally formed but rather formed separately and attached to each other, e.g. by way of a lockable (further) hinge joint. In another alternative, the first and second portions may be integrally formed, but it may be that one or both of the top and bottom surfaces of the respective first and second portions are not continuations of the same surface.

As above, the gradients of the top and/or bottom surfaces of the second buoyant portions 92*b*, 112*b* of the first bodies 92, 112 may vary along their lengths. For example, FIG. 12 (in which the first portion 92*a* of the first body 92 is identical to that shown in FIGS. 7, 8, and which omits the hinge joint 96 and the second body 94) shows an alternative version of the first body 92 in which the top and bottom sloped surfaces of the second portion 92*b* have proximal portions 92*b*' (i.e. proximal to the first portion 92*a*) extending in a fore direction from the first buoyant portion 92*a* and having steeper downward gradients in the direction away from the hinge joint than distal portions 92*b*" (i.e. distal to the first portion 92*a*) thereof which extend in the said fore direction (in this case from the proximal portions 92*b*') to the fore edge 100. Indeed, the proximal portions 92*b*' of the top and bottom surfaces slope downwards relative to the still water surface 98 (and thus to the horizontal, in this case at angles of around 25° to the horizontal) as they extend in the fore direction, while the distal portions 92*b*" of the top and bottom surfaces are horizontal as they extend in the fore direction (i.e. parallel to the still water surface). The angle between a tangent to the said proximal portion of the top or bottom surface and the vertical differs from the angle between a tangent to the said distal portion of the said respective top or bottom surface and the vertical by around 25°.

The different gradients of the proximal and distal portions 92*b*', 92*b*" of the top and bottom surfaces of the second portion 92*b* of the first body 92 cause water from incident waves to change direction as it flows over the length of the first body 92. Different pressure distributions are thereby generated along the lengths of the proximal and distal portions 92*b*', 92*b*", thereby causing different forces to be exerted along their lengths by the incoming water flow. The gradients of the proximal and distal portions 92*b*', 92*b*" thus affect the torque generated about the hinge joint when waves are incident on the body 92. Accordingly, by providing the proximal and distal portions 92*b*', 92*b*" of the top and bottom surfaces of the second portion 92*b* of the first body 92 with different gradients, an additional degree of freedom (relative gradients of proximal and distal portions) is provided which can be optimised to extract the maximum power output for a given set of prevailing wave conditions (e.g. compared to a body or a portion of a body having a constant gradient along its length).

It will be understood that the proximal portions 92*b*' of the top and bottom surfaces may alternatively be provided with relatively shallower gradients in the fore direction than those of the distal portions 92*b*" and the distal portions 92*b*" may be provided with relatively steeper gradients than those of the proximal portions 92*b*' in the fore direction to achieve the same effects. It will also be understood that the (distal or proximal) portion of the second portion 92*b* having the shallower slope may instead be sloped with respect to the still water surface 98 (and with respect to the horizontal). It may be that the portion of the second portion 92*b* having the steeper slope may be vertical (i.e. perpendicular) with respect to the still water surface 98 (and with respect to the horizontal).

Figure 12:
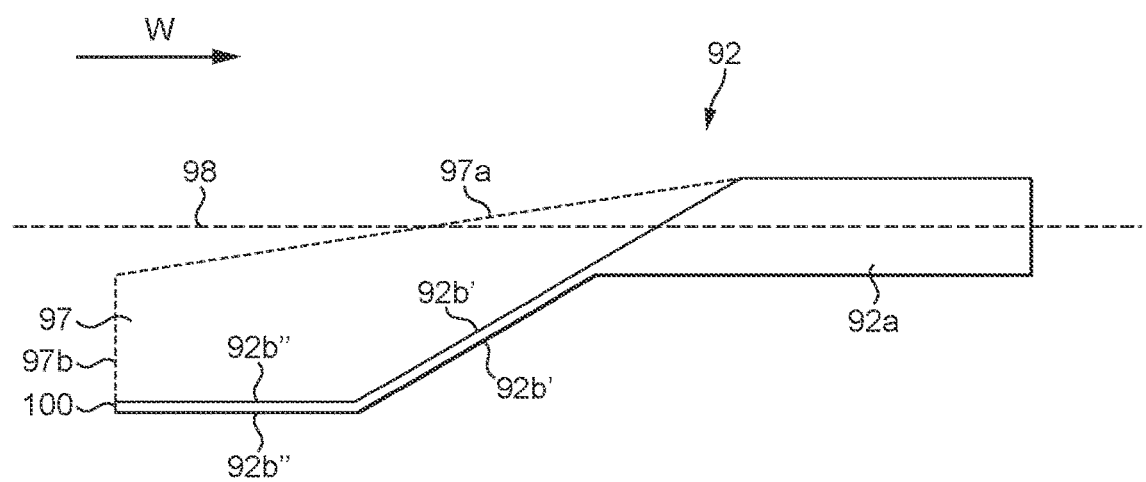
FIG. 12 is a schematic side elevation view of part of an another alternative raft wave energy conversion device in the still water at rest position.

Also shown in FIG. 12 are wall features 97 extending along the top surface of the second portion 92*b* between the first portion 92*a* and the fore end 100 to prevent or at least reduce the flow of water from the sides. In this case, the walls 97 have upper edges 97*a* sloping downwards (in this case at angles of around) 15° relative to the horizontal (and to the top surface of the first portion 52*a* and the still water surface 98) as they extend in a fore direction from above the water surface 98 proximate to the first portion 92*a* of the first body 92 to under the water surface 98 proximate to the fore edge 100. The walls 97 further comprise fore edges 97*b* extending vertically upwards from the fore edge 100 of the second portion 92*b* of the first body 92 to meet the upper edges 97*a*.

Figure 13:
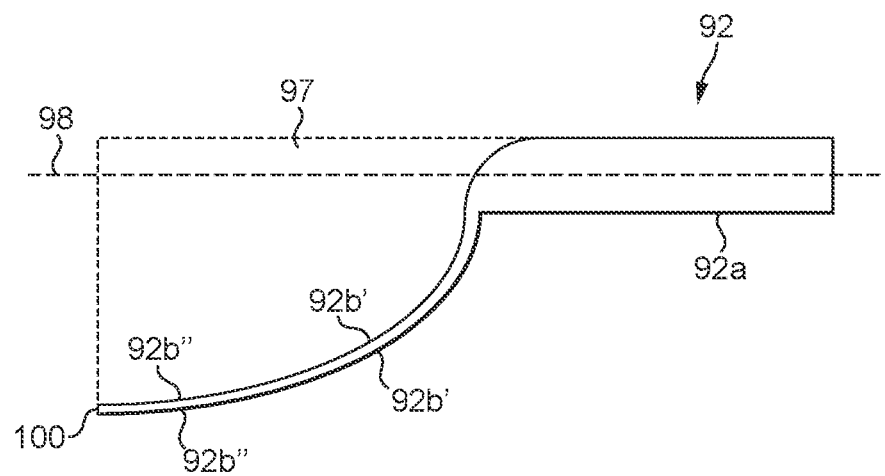
FIG. 13 is a schematic elevation view of part of another alternative raft wave energy conversion device in the still water at rest position.

In another example, FIG. 13 (in which the first portion 92*a* of the first body 92 is similar to that shown in FIGS. 7, 8, and which omits the hinge joint 96 and the second body 94) shows another alternative version of the first body 92 in which the planar top and bottom surfaces of the second portion 92*b* are continuously curved as they extend between the first portion 92*a* and the fore edge 100. The top surface of the second portion 92*b* is initially convex, before changing curvature to become concave as it extends further fore towards the fore edge 100. The bottom surface of the second portion 92*b* is concave as it extends from the first portion 92*a* to the fore edge 100. The gradients of the concave portions of the top and bottom surfaces gradually reduce in steepness as the top and bottom surfaces extend from the first portion 92*a* towards the fore edge 100. An angle between a tangent to a proximal portion of a concave portion of the top or bottom surface (i.e. proximal to the first portion 92*a*) having the steepest gradient (which is approximately vertical) and the vertical differs from an angle between a tangent to a distal portion of the said top or bottom surface (i.e. distal to the first portion 92*a*) having the shallowest gradient (which is approximately horizontal) and the vertical by around 90°.

Again the varying gradients of the top and bottom surfaces of the second portion 92*b* of the first body 92 along their lengths cause water from incident waves to change direction as it flows over the length of the first body 92. Different pressure distributions are thereby generated along the lengths of the top and bottom surfaces of the second portion 92*b*, thereby causing different forces to be exerted along their lengths by the incoming water flow. The curved top and bottom surfaces of the second portion 92*b* thus affect the torque generated about the hinge joint when waves are incident on the body 92. Accordingly, by providing the top and bottom surfaces of the second portion 92*b* of the first body 92 with varying gradients along their lengths, an additional degree of freedom (relative gradients of proximal and distal portions) is provided which can be optimised to extract the maximum power output for a given set of prevailing wave conditions (e.g. compared to a body or a portion of a body having a constant gradient along its length).

It will be understood that the proximal portions of the top and bottom surfaces may alternatively be provided with relatively shallower gradients in the fore direction and the distal portions may be provided with the relatively steeper gradient in the fore direction. Again, the first body 92 of the embodiment of FIG. 13 comprises wall features 97 extending along the top surface of the second portion 92*b* between the first portion 92*a* and the fore end 100 to prevent or at least reduce the flow of water from the sides, similarly to the embodiment of FIG. 11.

Figure 14:
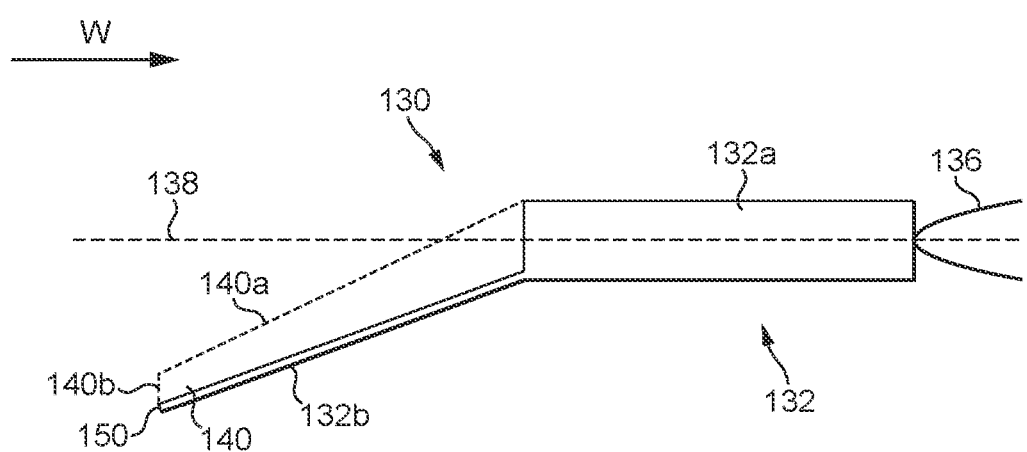
FIG. 14 is a schematic elevation view of part of another alternative raft wave energy conversion device in the still water at rest position.

FIG. 14 shows in schematic elevation part of another alternative hinged raft wave energy conversion device 130 in the still water rest position, the device 130 comprising a first, fore floating body 132 and a second, aft floating body (not shown) connected by a hinge joint 136. The still water line is indicated by a dashed line 138. As before, the hinged raft wave energy conversion device 130 is configured to convert wave energy to electrical energy by way of incoming waves causing relative flexing of the first and second bodies about the hinge joint 136. In this case, the first body 132 comprises a first portion 132*a* and a second portion 132*b*, the second portion 132*b* extending fore of the first portion 132*a*. Similarly to the embodiments of FIGS. 7, 8, the first portion 132*a* conforms to a cuboidal shape and floats at the water surface, having a portion above the waterline 138 and a portion below the waterline 138. Similarly to the embodiments of FIGS. 9, 10, the second portion 132*b* is provided in the form of a plate extending fore of the first portion 132*a* and having a mean density which is greater than that of the first portion 132*a* (in this case by a factor of two). However, in this case, the second portion 132*b* extends from the bottom surface and a surface intermediate the top and bottom surface of the first portion 132*a* (rather than from the top and bottom surfaces of the first portion 132*a*). The second portion 132*b* is entirely under the waterline 138. Planar top and bottom surfaces of the second portion 132*b* are parallel to each other and sloped downwards relative to the still water surface 138 (and to the horizontal, in this case at an angle of around 25° to the horizontal) as they extend in a fore direction away from the first portion 132*a*.

The second body may have a similar arrangement to the first body 132. However, typically the second body is provided with a dissimilar resonant frequency (at least in flex about the hinge joint 136) to the first body 132, for example either because it has a first portion having a longer length along the still waterline 138 than the first portion 132*a* (as per the embodiments of FIG. 8, 10) or because it has a second portion which extends deeper vertically under the still waterline 138 than the second portion 132*b* of the first body 132 (as per the embodiments of FIGS. 7, 9) such that a greater volume of water sits on the said second portion of the second body than on the second portion of the first body.

The device 130 is also provided with wall features 140 (shown in dashed lines in FIG. 14) extending on either side of the top surface of the second portion 132*b* of the first body 132 which prevent or at least reduce the flow of water from the sides (e.g. in a direction extending across the water plane but perpendicular to the direction W) onto the said top surface(s). This results in a smoother flow of water to and fro as the second portion 132*b* of the first body 132 dips into and out of the waves in use. The walls have upper edges 140*a* sloping downwards (in this case at angles of around 40°) relative to the horizontal (and to the top surface of the first portion 132*a* and the still water surface 138) and converging towards the second portion 132*b* as they extend in a fore direction from above the water surface 138 proximate to the first portion 132*a* of the first body 132 to under the water surface 138 proximate to a fore edge 150 of the first body 132. The walls 140 further comprise fore edges 140*b* extending vertically upwards from the fore edge 150 of the second portion 132*b* of the first body 132 to meet the upper edges 140*a*.

Figure 15:
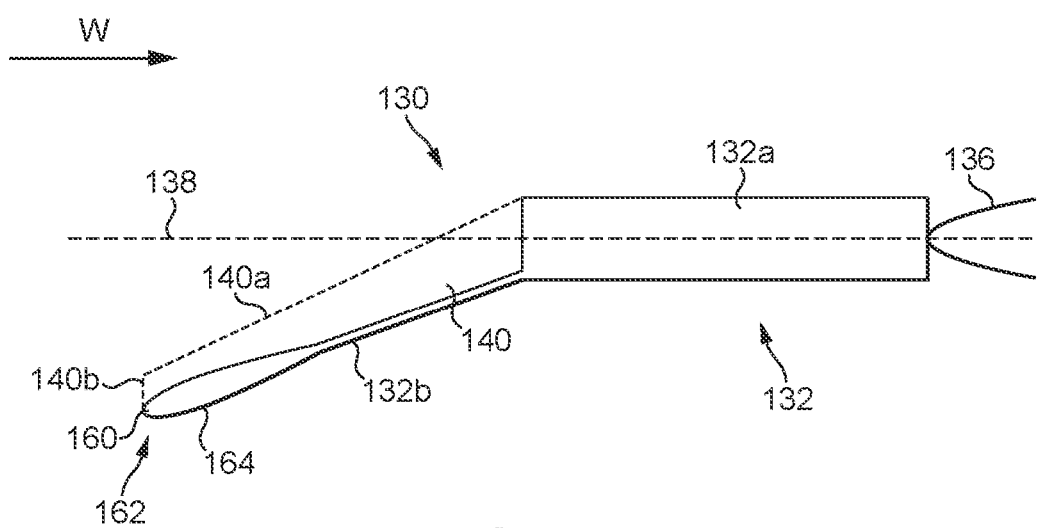
FIG. 15 is a schematic elevation view of part of another alternative raft wave energy conversion device in the still water at rest position.

FIG. 15 shows in schematic elevation part of a variation of the alternative hinged raft wave energy conversion device 130 of FIG. 14 in the still water rest position. In this case, the second portion 132*b* of the first body 132 has a distal end 160 having a hydrodynamic fairing 162 configured to receive incident waves propagating in the wave propagation direction W. The hydrodynamic fairing comprises a smooth, curved hydrodynamic surface 164 which results in water flow from incident waves changing direction (i.e. accelerating) around the hydrodynamic surface gradually (more gradually than, for example, the sharper distal end 150 of FIG. 14 where, due to fluid viscosity, there are turbulent losses in fluid energy as the flow rounds the distal end) so that less losses are experienced by the incident flow due to turbulence. In addition, the hydrodynamic fairing also helps to inhibit generation of turbulent water flow produced by motion of the first and/or second bodies in the water. Although not shown in FIG. 15, it may be that the second, aft body of the device 130 of FIG. 15 is identical to the first, fore body 132 of FIG. 15 but extending in the opposite direction with respect to the hinge joint 136 (i.e. such that the distal end 160 of the second body is aft relative to the first portion 132*a* of the second body). Although not shown in FIG. 15, it may be that the wall features 140 also have hydrodynamic fairings comprising smooth, curved hydrodynamic surfaces arranged to receive incident waves propagating in the wave propagation direction W. This further helps to reduce the generation of turbulent water flow from incident waves, which helps to increase the quantity of energy which can be extracted from the said incident waves.

Further modifications and variations may be made within the scope of the invention herein disclosed.

The invention claimed is:
1. A wave energy conversion device (WEC) comprising:
a first fore floating body; and
a second aft floating body;
wherein the first fore and second aft floating bodies are connected by a hinge joint for rotation of the first fore and second aft floating bodies relative to each other, in use, about an axis parallel to the still water surface and transverse to a direction of wave propagation;
wherein the first fore and second aft floating bodies extend away from the hinge joint in opposite directions such that the first fore and second aft floating bodies are respectively elongated in the opposite directions away from the hinge joint;
wherein at least one of the first fore floating body or the second aft floating body has a sloped top surface extending downwardly in a direction away from the hinge joint, the sloped top surface having a constant gradient or a concave curvature, at least a portion of the sloped top surface being configured to be under a waterline at least when the device is in a still water rest position, wherein water on the sloped top surface of the at least one of the first fore or second aft floating body adds to the effective mass, and affects the resonant frequency of the at least one of the first fore or second aft floating body; and
wherein the WEC is a self-reacting hinged raft WEC and motion of the raft to absorb power from incoming waves is a result of a reaction of one of the first fore floating body or second aft floating body against the other of the first fore floating body or second aft floating body, by way of the hinge joint.

2. The device of claim 1 wherein the sloped top surface extends downwards, in the direction away from the hinge joint, at least a portion of the sloped top surface being under the waterline at least when the device is in the still water rest position.

3. The device of claim 1 wherein the sloped top surface extends downwards, in the direction away from the hinge joint to the end of the first fore or second aft floating body distal to the hinge joint, and extends to under the waterline when the device is in the still water rest position.

4. The device of claim 1 wherein the sloped top surface extends downwards, in the direction away from the hinge joint and in alignment with the direction of wave propagation, at least a portion of the sloped top surface being under the waterline at least when the device is in the still water rest position.

5. The device of claim 1 wherein at least one of the first fore floating body or the second aft floating body has a sloped bottom surface extending in the direction away from the hinge joint, at least a portion of the sloped bottom surface being under the waterline at least when the device is in the still water rest position.

6. The device of claim 1 wherein at least one of the first fore floating body or the second aft floating body has a sloped bottom surface extending downwards, in the direction away from the hinge joint, at least a portion of the sloped bottom surface being under the waterline at least when the device is in the still water rest position.

7. The device of claim 1 wherein a length of the at least one first fore or second aft floating body having the sloped top surface extending under the waterline, in the direction away from the hinge joint and in alignment with the direction of wave propagation, is at least 30% longer than the length of the first fore floating body or the second aft floating body along the waterline, when the device is in the still water rest position.

8. The device of claim 1 wherein at least one of the first fore floating body or the second aft floating body has a surface having a first portion and a second portion, wherein the first portion comprises the sloped top surface and the second portion has a gradient different from that of the sloped top surface.

9. The device of claim 8 wherein the surface comprising the first and second portions is a surface of the first fore floating body, and wherein the second portion is fore or aft of the first portion.

10. The device of claim 8 wherein an angle between a tangent to the sloped top surface and the vertical differs from an angle between a tangent to the second portion and the vertical by between 10° and 80°.

11. The device of claim 1 wherein the sloped top surface of said at least one of the first fore floating body or the second aft floating body is a top surface thereof, the top surface comprising wall features on either side of the sloped top surface and extending in a direction aligned with the direction of wave propagation and projecting upwardly from the sloped top surface.

12. The device of claim 1 wherein at least one of the first fore floating body or the second aft floating body has a wedge shape with a leading edge pointing towards a direction from which the waves approach the device.

13. The device of claim 1 wherein at least the first fore body comprises said sloped top surface.

14. The device of claim 1 wherein at least the second aft body comprises said sloped top surface.

15. The device of claim 1 wherein at least one of the first fore floating body or the second aft floating body comprises a first portion comprising the sloped top surface thereof, the first portion of the at least one of the first fore or second aft floating body extending from a second portion of the at least one of the first fore or second aft floating body provided fore or aft of the first portion of the at least one of the first fore or second aft floating body, the second portion of the at least one of the first fore or second aft floating body having a mean density which is different to that of the first portion.

16. The device of claim 15 wherein the first portion of the body comprises a plate comprising the sloped top surface.

17. The device of claim 1 wherein at least one of the first fore floating body or the second aft floating body comprises a wave flow resisting portion at least a portion of which is provided under the waterline at least when the device is in the still water rest position, the wave flow resisting portion comprising the sloped top surface of the at least one of the first fore or second aft floating body.

18. The device of claim 17 wherein the first fore floating body comprises the wave flow resisting portion comprising said sloped top surface, wherein the first fore floating body comprises a further portion aft of the wave flow resisting portion from which the wave flow resisting portion extends, wherein the wave flow resisting portion extends further vertically under the waterline than the further portion at least when the device is in the still water rest position.

19. The device of claim 17 wherein the second aft floating body comprises the wave flow resisting portion comprising said sloped top surface, wherein the second aft floating body comprises a further portion fore of the wave flow resisting portion from which the wave flow resisting portion extends, wherein the wave flow resisting portion extends further vertically under the waterline than the further portion at least when the device is in the still water rest position.

20. The device of claim 17 wherein the wave flow resisting portion has a distal end under the waterline.

21. The device of claim 20 wherein the distal end of the wave flow resisting portion comprises a hydrodynamic fairing.

22. The device of claim 21 wherein the hydrodynamic fairing comprises a curved hydrodynamic surface configured to inhibit the generation of turbulent water flow from received incoming waves.

23. The device of claim 1 wherein a volume of water sits on a portion of each of the first fore floating body and the second aft floating body, a portion of the first fore and second aft floating bodies being submerged under the waterline, at least when the device is in the still water rest position.

24. The device of claim 23 wherein the volume of water sits on the sloped top surface.

25. The device of claim 1 wherein the sloped top surface extends from above the waterline to under the waterline at least when the device is in the still water rest position.

26. The device of claim 1 wherein the first fore and second aft floating bodies are formed and arranged to be dissimilar in resonant frequency.

27. The device of claim 26 wherein the first fore and second aft floating bodies have dissimilar resonant frequencies in flex about the hinge joint.

28. The device of claim 1 wherein both the first fore floating body and the second aft floating body comprise sloped surfaces extending in the respective directions away from the hinge joint, at least part of each of the sloped surfaces being under the waterline at least when the device is in the still water rest position.

29. The device of claim 28 wherein the second aft floating body is longer than the first fore floating body.

30. The device of claim 28 wherein the sloped surface of the second aft floating body extends further vertically beneath the waterline than the sloped surface of the first fore floating body at least when the device is in the still water rest position.

31. The device of claim 28 wherein both the first fore floating body and the second aft floating body comprise respective wave flow resisting portions comprising respective said sloped surfaces extending in the respective directions away from the hinge joint, at least part of each said wave flow resisting portion being under the waterline at least when the device is in the still water rest position.

32. The device of claim 31 wherein the wave flow resisting portion of the second aft floating body extends further vertically under the waterline than the first fore floating body.

33. A method of extracting energy from waves, the method comprising:
providing at least one hinged raft wave energy conversion device according to claim 1 and including a power take off system to generate electricity from the action of the device in response to wave motion; and
locating the device or a plurality of devices in a body of water.

34. The hinged raft wave energy conversion device according to claim 1, wherein the first fore floating body and the second aft floating body are directly connected to each other by the hinge joint.

35. The hinged raft wave energy conversion device according to claim 1, wherein the first fore floating body and second aft floating body each have a sloped top surface extending in a direction away from the hinge joint, at least a portion of the sloped top surface being under a waterline at least when the device is in a still water rest position, wherein water on the sloped top surface of the first fore and second aft floating bodies adds to the effective mass of the first fore and second aft floating bodies.

36. The wave energy conversion device according to claim 1, wherein the first fore and second aft floating bodies move more, relative to each other, than would be the case with no water on the sloped top surface of the at least one of the first fore or second aft floating body as a result of the water on the sloped top surface of the at least one of the first fore fore or second aft floating body.

37. The wave energy conversion device according to claim 1, wherein the water on the sloped top surface of the at least one fore or second aft floating body increases the magnitude of the wave excitation force.

38. The wave energy conversion device according to claim 1, wherein the water on the sloped top surface of the at least one fore or second aft floating body allows the device to capture more energy from waves that have a longer mean wavelength than the length of the device.

39. The wave energy conversion device according to claim 1, wherein the water on the sloped top surface of both the first fore and the second aft floating bodies adds to the effective mass, and affects the resonant frequency of both the first fore and second aft floating bodies.

40. The wave energy conversion device according to claim 1, wherein the first fore and second aft floating bodies extend downwards and away from the hinge joint.

41. The wave energy conversion device according to claim 1, wherein the slopes of the top surfaces vary along their lengths, the said sloped top surfaces comprising a proximal portion and a distal portion, wherein the proximal portion has a steeper downwards gradient than the distal portion.

42. A hinged raft wave energy conversion device (WEC) comprising:
a first fore floating body; and
a second aft floating body;
wherein the first fore and second aft floating bodies are connected by a hinge joint for rotation of the first fore and second aft floating bodies relative to each other, in use, about an axis parallel to the still water surface and transverse to a direction of wave propagation;
wherein the first fore and second aft floating bodies extend away from the hinge joint in opposite directions such that the first fore and second aft floating bodies are respectively elongated in the opposite directions away from the hinge joint;
wherein at least one of the first fore floating body or the second aft floating body has a sloped top surface extending downwardly in a direction away from the hinge joint, the sloped top surface having a constant gradient or a concave curvature, at least a portion of the sloped top surface being under a waterline at least when the device is in a still water rest position, wherein water on the sloped top surface of the at least one of the first fore or second aft floating body adds to the effective mass of the at least one of the first fore or second aft floating body wherein the first fore and second aft bodies are directly connected to each other by the hinge joint without any other part of the hinged raft wave energy conversion device being connected between the the first fore floating body and the second aft floating body and to hinge joint; and
wherein the WEC is a self-reacting hinged raft WEC and motion of the raft to absorb power from incoming waves is a result of a reaction of one of the first fore floating body or second aft floating body against the other of the first fore floating body or second aft floating body, by way of the hinge joint.

43. The hinged raft wave energy conversion device according to claim 42, wherein no ballast is connected to the hinged raft wave energy conversion device below the hinge joint.

44. A hinged raft wave energy conversion device (WEC) comprising:
a first fore floating body; and
a second aft floating body;
wherein the first fore and second aft floating bodies are connected by a hinge joint for rotation of the first fore and second aft floating bodies relative to each other, in use, about an axis parallel to the still water surface and transverse to a direction of wave propagation;
wherein the first fore and second aft floating bodies extend away from the hinge joint in opposite directions such that the first fore and second aft floating bodies are respectively elongated in the opposite directions away from the hinge joint;
wherein at least one of the first fore floating body or the second aft floating body has a sloped top surface extending downwardly in a direction away from the hinge joint, the sloped top surface having a constant gradient or a concave curvature, at least a portion of the sloped top surface being configured to be under a waterline at least when the device is in a still water rest position, wherein water on the sloped top surface of the at least one of the first fore or second aft floating body adds to the effective mass, and affects the resonant frequency of the at least one of the first fore or second aft floating body; and
wherein the first fore and second aft floating bodies move more as a result of the water on the sloped top surface of the at least one of the first fore or second aft floating body.

45. A hinged raft wave energy conversion device (WEC) comprising:
a first fore floating body; and
a second aft floating body;
wherein the first fore and second aft floating bodies are connected by a hinge joint for rotation of the first fore and second aft floating bodies relative to each other, in use, about an axis parallel to the still water surface and transverse to a direction of wave propagation;

wherein the first fore and second aft floating bodies extend away from the hinge joint in opposite directions such that the first fore and second aft floating bodies are respectively elongated in the opposite directions away from the hinge joint;

wherein at least one of the first fore floating body or the second aft floating body has a sloped top surface extending downwardly in a direction away from the hinge joint, the sloped top surface having a constant gradient or a concave curvature, at least a portion of the sloped top surface being configured to be under a waterline at least when the device is in a still water rest position, wherein water on the sloped top surface of the at least one of the first fore or second aft floating body adds to the effective mass, and affects the resonant frequency of the at least one of the first fore or second aft floating body; and wherein the water on the sloped top surface of the at least one fore or second aft floating body increases the magnitude of the wave excitation force.

46. A hinged raft wave energy conversion device (WEC) comprising:

a first fore floating body; and a second aft floating body;

wherein the first fore and second aft floating bodies are connected by a hinge joint for rotation of the first fore and second aft floating bodies relative to each other, in use, about an axis parallel to the still water surface and transverse to a direction of wave propagation;

wherein the first fore and second aft floating bodies extend away from the hinge joint in opposite directions such that the first fore and second aft floating bodies are respectively elongated in the opposite directions away from the hinge joint;

wherein at least one of the first fore floating body or the second aft floating body has a sloped top surface extending downwardly in a direction away from the hinge joint, the sloped to surface having a constant gradient or a concave curvature, at least a portion of the sloped top surface being configured to be under a waterline at least when the device is in a still water rest position, wherein water on the sloped top surface of the at least one of the first fore or second aft floating body adds to the effective mass, and affects the resonant frequency of the at least one of the first fore or second aft floating body; and wherein the water on the sloped top surface of the at least one fore or second aft floating body allows the device to capture more energy from waves that have a longer mean wavelength than the length of the device.

47. A hinged raft wave energy conversion device (WEC) comprising:

a first fore floating body; and a second aft floating body;

wherein the first fore and second aft floating bodies are connected by a hinge joint for rotation of the first fore and second aft floating bodies relative to each other, in use, about an axis parallel to the still water surface and transverse to a direction of wave propagation;

wherein the first fore and second aft floating bodies extend away from the hinge joint in opposite directions such that the first fore and second aft floating bodies are respectively elongated in the opposite directions away from the hinge joint;

wherein at least one of the first fore floating body or the second aft floating body has a sloped top surface extending downwardly in a direction away from the hinge joint, the sloped to surface having a constant gradient or a concave curvature, at least a portion of the sloped top surface being configured to be under a waterline at least when the device is in a still water rest position, wherein water on the sloped top surface of the at least one of the first fore or second aft floating body adds to the effective mass, and affects the resonant frequency of the at least one of the first fore or second aft floating body; and wherein both the first fore and second aft floating bodies extend downwards and away from the hinge joint.

48. A hinged raft wave energy conversion device (WEC) comprising:

a first fore floating body; and a second aft floating body;

wherein the first fore and second aft floating bodies are connected by a hinge joint for rotation of the first fore and second aft floating bodies relative to each other, in use, about an axis parallel to the still water surface and transverse to a direction of wave propagation;

wherein the first fore and second aft floating bodies extend away from the hinge joint in opposite directions such that the first fore and second aft floating bodies are respectively elongated in the opposite directions away from the hinge joint;

wherein at least one of the first fore floating body or the second aft floating body has a sloped top surface extending downwardly in a direction away from the hinge joint, the sloped top surface having a constant gradient or a concave curvature, at least a portion of the sloped top surface being configured to be under a waterline at least when the device is in a still water rest position, wherein water on the sloped top surface of both the first fore and the second aft floating bodies adds to the effective mass, and affects the resonant frequency of both the first fore and second aft floating body, wherein the WEC is a self-reacting hinged raft WEC, wherein both the first fore and second aft floating bodies extend downwards and away from the hinge joint, and motion of the raft to absorb power from incoming waves is a result of reaction of one of the first fore floating body or second aft floating body against the other of the first fore floating body or second aft floating body, by way of the hinge joint; and wherein the water on the sloped top surface of the at least one fore or second aft floating body increases the magnitude of the wave excitation force.

* * * * *